US010523437B2

(12) United States Patent
Barbosa E Oliveira et al.

(10) Patent No.: US 10,523,437 B2
(45) Date of Patent: Dec. 31, 2019

(54) SYSTEM AND METHOD FOR AUTHENTICATION OF THINGS

(71) Applicants: LG ELECTRONICS INC., Seoul (KR); Universidade Federal de Minas Gerais, Belo Horizonte (BR)

(72) Inventors: Leonardo Barbosa E Oliveira, Belo Horizonte (BR); Antonio Alfredo Ferreira Loureiro, Belo Horizonte (BR); Antonio Lemos Maia Neto, Belo Horizonte (BR); Harsh Kupwade Patil, Santa Clara, CA (US); Michele Nogueira Lima, Curitiba (BR); Italo Fernando Scota Cunha, Belo Horizonte (BR); Artur Luis Fernandes De Souza, Belo Horizonte (BR); Leonardo De Abreu Cotta, Belo Horizonte (BR); Luiz Felipe Zafra Saggioro, Uberlândia (BR); Lucas Goulart Grossi, Belo Horizonte (BR); Ivan De Oliveira Nunes, Irvine, CA (US); Ronaldo Resende Rocha Junior, Belo Horizonte (BR)

(73) Assignees: LG ELECTRONICS INC., Seoul (KR); Universidade Federal de Minas Gerais, Belo Horizonte (BR)

( * ) Notice: Subject to any disclaimer, the term of this patent is extended or adjusted under 35 U.S.C. 154(b) by 190 days.

(21) Appl. No.: 15/416,963

(22) Filed: Jan. 26, 2017

(65) Prior Publication Data

US 2017/0214529 A1    Jul. 27, 2017

Related U.S. Application Data

(60) Provisional application No. 62/287,832, filed on Jan. 27, 2016.

(30) Foreign Application Priority Data

Oct. 17, 2016  (KR) .......................... 10-2016-0134394

(51) Int. Cl.
*H04L 9/08* (2006.01)
*H04L 9/32* (2006.01)
(Continued)

(52) U.S. Cl.
CPC .......... *H04L 9/3226* (2013.01); *H04L 9/0822* (2013.01); *H04L 9/0847* (2013.01);
(Continued)

(58) Field of Classification Search
CPC ... H04L 63/061; H04L 9/0825; H04L 9/0861; H04L 9/0877; H04L 63/0428
(Continued)

(56) References Cited

U.S. PATENT DOCUMENTS 7,142,674 B2 * 11/2006 Brickell .................. G06F 21/85
380/44
7,234,062 B2 * 6/2007 Daum ................. H04L 12/2803
380/277
(Continued)

*Primary Examiner* — Monjur Rahim
(74) *Attorney, Agent, or Firm* — Lee Hong Degerman Kang & Waimey

(57) ABSTRACT

An Authentication Of Things (AOT) system includes a cloud server configured to control a cloud domain connected with a plurality of devices, a home server configured to control a home server connected with a plurality of devices, a first device corresponding to a new device, and a second device of a root user connected with the home domain while authentication is completed in the home server. In this case, the first device loads cryptographic material of the cloud server from the cloud server in a pre-deployment stage, the cryptographic material includes at least one selected from the group consisting of an identifier of the first device in the cloud server, a first private key of an ID-based cryptography
(Continued)

system of the first device in the cloud server, a first pairwise key of the first device in the cloud server, and a counter of the first device, and if the first device is shipped to a trader, the cloud server deletes the first private key from the cloud server.

10 Claims, 17 Drawing Sheets

(51) Int. Cl.
*H04W 12/06* (2009.01)
*H04L 29/06* (2006.01)
*H04W 4/70* (2018.01)

(52) U.S. Cl.
CPC ......... *H04W 12/06* (2013.01); *H04L 63/0428* (2013.01); *H04L 63/083* (2013.01); *H04L 63/0823* (2013.01); *H04L 63/0876* (2013.01); *H04L 2463/062* (2013.01); *H04W 4/70* (2018.02)

(58) Field of Classification Search
USPC .......................................................... 380/283
See application file for complete search history.

(56) References Cited

U.S. PATENT DOCUMENTS

| | | | | |
|---|---|---|---|---|
| 7,493,661 B2* | 2/2009 | Liu | ..................... | H04L 63/0428 380/259 |
| 7,548,623 B2* | 6/2009 | Manabe | ................ | H04L 63/061 380/278 |
| 7,903,822 B1* | 3/2011 | Hair | .................... | H04L 63/0442 380/282 |
| 8,477,948 B2* | 7/2013 | Shon | ..................... | H04W 12/04 380/255 |
| 9,319,223 B2* | 4/2016 | Nix | ......................... | H04W 4/70 |
| 2003/0174836 A1* | 9/2003 | Vadekar | ................ | H04L 9/0662 380/37 |
| 2006/0018485 A1* | 1/2006 | Diefenderfer | ....... | H04L 63/0435 380/283 |
| 2012/0011360 A1* | 1/2012 | Engels | .................... | H04L 9/006 713/166 |
| 2014/0270166 A1* | 9/2014 | Avanzi | .................. | H04L 9/0822 380/201 |
| 2014/0310515 A1* | 10/2014 | Kim | ......................... | H04L 9/321 713/155 |
| 2015/0067329 A1* | 3/2015 | Ben Saied | ............ | H04L 9/0838 713/168 |
| 2015/0106616 A1* | 4/2015 | Nix | ......................... | H04W 4/70 713/156 |
| 2015/0113172 A1* | 4/2015 | Johnson | .................. | H04L 67/34 709/245 |
| 2015/0113275 A1* | 4/2015 | Kim | ......................... | H04L 9/3273 713/169 |
| 2015/0222517 A1* | 8/2015 | McLaughlin | ........... | H04W 4/70 713/156 |
| 2015/0295713 A1* | 10/2015 | Oxford | .................... | G06F 21/78 713/171 |
| 2015/0326398 A1* | 11/2015 | Modarresi | ............... | H04L 63/08 713/181 |
| 2015/0358157 A1* | 12/2015 | Zhang | .................... | H04L 9/0852 380/278 |
| 2016/0006729 A1* | 1/2016 | Yang | .................... | H04L 63/0428 713/156 |
| 2016/0085960 A1* | 3/2016 | Priev | ....................... | G06F 21/44 726/7 |
| 2016/0112870 A1* | 4/2016 | Pathuri | ................. | H04L 63/104 726/4 |
| 2016/0149696 A1* | 5/2016 | Winslow | ............... | H04L 9/0618 380/28 |
| 2016/0182228 A1* | 6/2016 | Smith | .................... | H04L 9/0841 713/171 |

* cited by examiner

Entire IoT device life-cycle

> SESSIONKEY(key $k$, counter $i$)
> 1.    $k^i := \text{PRF}(i)_k$
> 2.    $i := i + 1$
> 3.    return $k^i$
>
> Where the symbols denote:
>   $k^i$ :    $i$-th session key
>   $\text{PRF}(m)_k$ :    PRF over $m$ using key $k$ SessionKey procedure.

FIG. 4

KEYAGREEMENT(*device A, device B*)
1. $A \to B$:    $n_A$, session_req
2.       $B$:    $P^I_{A,\mathcal{H}} := \text{MAP}(id_{A,\mathcal{H}})$
3.       $B$:    $k_{A,B} := \hat{e}(S^I_{B,\mathcal{H}}, P^I_{A,\mathcal{H}})$
4.       $B$:    $c_A := 0$
5.       $B$:    $k^i_{A,B} := \text{SESSIONKEY}(k_{A,B}, c_A)$
6. $B \to A$:    $n_B, \text{MAC}(n_A)_{k^i_{A,B}}$
7.       $A$:    {*Computes the pairwise key $k^i_{A,B}$, analogously*}
8. $A \to B$:    $\text{MAC}(n_B \mid n_A)_{k^i_{A,B}}$
9. $B \to A$:    session_ack, $\text{MAC}(n_A + 1)_{k^i_{A,B}}$ Where the new symbols denote:
- $\to$:    unicast transmission
- $n_X$:    nonce generated by $X$
- session_req, _ack:    request and acknowledgment labels
- $I$:    Identity-based cryptosystem
- $\mathcal{H}$:    Home domain
- $P^Y_{X,Z}$:    $X$'s public key of cryptosystem Y in domain $Z$
- $\text{MAP}(m)$:    mapping function over $m$
- $id_{X,\mathcal{Y}}$:    $X$'s identity in domain $\mathcal{Y}$
- $k_{X,Y}$:    pairwise key shared by $X$ and $Y$
- $\hat{e}$:    crypto-friendly bilinear pairing
- $S^Y_{X,Z}$:    $X$'s private key of cryptosystem Y in domain $Z$
- $c_X$:    counter one keeps up-to-date with $X$
- $k^i_{X,Y}$:    $i$-th session key shared by $X$ and $Y$
- $\text{MAC}(n_X)_k$:    MAC over the message appended to $n_X$ using key $k$
- $\mid$:    concatenation KeyAgreement protocol

FIG. 5

KeyIssue(*device D, server S, domain Z, cryptosystem Y*)
1. $D \to S$: $n_D$, issue_req
2. $S \to D$: $n_S$, $\text{MAC}(n_D)_{k_{D,S}^i}$
3. $D \to S$: $\text{MAC}(n_S \mid n_D)_{k_{D,S}^i}$
4. $S \to D$: $\text{ENC}(S_{D,Z}^Y)_{k_{D,S}^i}$, issue_ack, $\text{MAC}(n_D + 1)_{k_{D,S}^i}$ Where the new symbols denote:
- issue_req, _ack : request and acknowledgment labels
- $\text{ENC}(m)_k$ : encryption over $m$ using key $k$ KeyIssue protocol

FIG. 6

Binding(*device D, user U*)
1. $D \to C$: $n_D$, bind_req
2. $C \to D$: $n_C$, $\text{MAC}(n_D)_{k_{D,C}^i}$
3. $D \to C$: bind, $id_{U,C}$, $\text{SIG}(n_C \mid n_D)_{s_{D,C}^l}$
4. $C$: binds $U$ to $D$
5. $C \to D$: bind_ack, $\text{MAC}(n_D + 1)_{k_{D,C}^i}$ Where the new symbols denote:
- $C$ : Cloud server
- bind_req, _ack : request and acknowledgment labels
- bind : command label
- $C$ : Cloud domain
- $\text{SIG}(n_X)_k$ : signature over the msg appended to $n_X$ using key $k$ Binding protocol

FIG. 7

> PRE-DEPLOYMENT(*Device D*)
> 1.     $C$:     $id_{D,C} := D's\ serial\#$
> 2.     $C$:     $S^{I}_{D,C} := secret^{I}_{C} \cdot \text{MAP}(id_{D,C})$
> 3.     $C \to D$:     $\text{PHY}(id_{D,C}, S^{I}_{D,C}, k_{D,C}, c_{D})$
> 4.     $C \Rightarrow T_{D}$:     $D$
>
> Where the new symbols denote:
> $secret^{X}_{Y}$:    secret parameter of cryptosystem $X$ in domain $Y$
> $\text{PHY}(m)$:    $m$ secured via a physical channel
> $\Rightarrow$:    secure shipping
> $T_{X}$:    trader of $X$ Pre-deployment stage

FIG. 8

> ORDERING(*device D, user U*)
> 1.     $U \to T_{D}$:     $\text{TLS}(\$\ |\ order\_req)$
> 2.     $T_{D} \to U$:     $\text{TLS}(pin_{D}\ |\ order\_ack)$
> 3.     $T_{D} \Rightarrow U$:     $D$
>
> Where the new symbols denote:
> $\text{TLS}(m)$:    $m$ protected via TLS
> $\$$:    payment
> $order\_req,\ \_ack$:    request and acknowledgment labels
> $pin_{X}$:    PIN to grant acess to $X$ Ordering stage

FIG. 9

DEPLOYMENT(device D)
1. $U_r \rightarrow D$ : PHY($pin_D$)
2. $D_{U_r} \rightarrow D$ : PHY($id_{U_r,\mathcal{H}}, P^I_{H,\mathcal{H}}, c_{\mathbb{G}_H}$)
3. $D \rightarrow D_{U_r}$ : PHY($id_{D,\mathcal{H}}, info_D, \text{ENC}(k_{D,H})_{P^I_{H,\mathcal{H}}}$)
4. $U_r \rightarrow D_{U_r}$ : PHY($\mathbb{A}_D, \mathbb{Y}_D$)
5. $D_{U_r} \rightarrow H$ : $n_{D_{U_r}}$, deploy_req
6. $H \rightarrow D_{U_r}$ : $n_H, \text{MAC}(n_{D_{U_r}})_{k^i_{D_{U_r},H}}$
7. $D_{U_r} \rightarrow H$ : deploy, $id_{D,\mathcal{H}}, \mathbb{A}_D, \mathbb{Y}_D, info_D,$
   $\text{ENC}(k_{D,H})_{P^I_{H,\mathcal{H}}}, \text{SIG}(n_H \mid n_{D_{U_r}})_{S^I_{D_{U_r},\mathcal{H}}}$
8. $H$ : $S^I_{D_U,\mathcal{H}} := secret^I_{\mathcal{H}} \cdot \text{MAP}(id_{D_U,\mathcal{H}})$
9. $H$ : $S^A_{D_U,\mathcal{H}} := secret^A_{\mathcal{H}} \cdot \text{MAP}(\mathbb{A}_{D_U})$
10. $D$ : KEYISSUE($D, H, \mathcal{H}, I$)
11. $D$ : KEYISSUE($D, H, \mathcal{H}, A$)
12. $H \Rightarrow \mathbb{G}_H$ : $\mathbb{Y}_{\mathbb{G}_H}, info_{\mathbb{G}_H}, c_{\mathbb{G}_H}, \text{SIG}_{S^I_{H,\mathcal{H}}}$
13. $D$ : BINDING ($D, U_r$)
14. $H \rightarrow D_{U_r}$ : deploy_ack, $\text{MAC}(n_{D_{U_r}} + 1)_{k^i_{D_{U_r},H}}$ Where the new symbols denote:
- $U_X$ : user $X$
- $r$ : root
- $D_{U_X}$ : personal device of user $X$
- $\mathbb{G}_X$ : domain's $X$ group of devices
- $info_X$ : $X$'s type and supported operations
- $\mathbb{A}_X$ : $X$'s set of attributes
- $\mathbb{Y}_X$ : $X$'s set of predicates
- $H$ : Home server
- deploy_req, _ack : request and acknowledgment labels
- deploy : command label
- $secret^X_{\mathcal{Y}}$ : secret parameter of cryptosystem $X$ in domain $\mathcal{Y}$
- $\Rightarrow$ : broadcast transmission Deployment stage

FIG. 10

FUNCTIONING(*user U, device A, device B, operation* op)
1.       $U$ :    uses $A$ to request op over $B$
2.  $A \to B$ :   $n_A$, op_req
3.  $B \to A$ :   $n_B, \Upsilon_{op}, \text{MAC}(n_A)_{k^i_{A,B}}$
4.  $A \to B$ :   op, $\text{SIG}(n_B \mid n_A)_{S^A_{A,\mathcal{H}}}$
5.       $B$ :    performs operation op
6.  $B \to A$ :   op_ack, $\text{MAC}(n_A + 1)_{k^i_{A,B}}$ Where the new symbol denotes:
op_req, _ack :   request and acknowledgment labels
     $\Upsilon_{op}$ :   operation op's predicate Functioning stage

FIG. 11

RETIREMENT(*user U, device A, device B*)
1.  $A$ :   {Requests retirement}
2.  $B$ :   UNBINDING($B,U$)
3.  $B$ :   deletes $S^i_{B,C}, S^i_{B,\mathcal{H}}, S^A_{B,\mathcal{H}}$ and $\mathbb{R}_B$
4.  $B$ :   displays on the screen 'retired'

Where the new symbol denotes:
$\mathbb{R}_X$ :   $X$'s pairwise key ring

Retirement stage

FIG. 12

```
REASSIGNMENT(user U, device A, device B, user V)
  1.         A :    {Requests reassignment}
  2.         B :    UNBINDING(B, U)
  3.         B :    deletes $S^I_{B,\mathcal{H}}$, $S^A_{B,\mathcal{H}}$ and $\mathbb{R}_B$
  4.         B :    displays "ownership reassigned"
  5.    U → V :    TLS($pin_D$)
  6.    U ⇒ V :    B
```

Reassignment stage

FIG. 13

```
INTERDOMAINKEYAGREEMENT(device A, device B)
  1.         A :    $P^I_{B,I} := \text{MAP}(id_{B,\mathcal{H}}) \cdot G^I_{\mathcal{H}_B} + P^I_{\mathcal{H}_B}$
  2.    A → B :    $n_A, x_A \cdot P^I_{B,I}$, inter_session_req
  3.         B :    $k_{A,B} := \hat{e}(S^I_{B,I}, x_A \cdot P^I_{B,I})^{x_B}$
  4.         B :    $c_B := 0$
  5.         B :    $k'_{A,B} := \text{SESSIONKEY}(k_{A,B}, c_B)$
  6.         B :    $P^I_{A,I} := \text{MAP}(id_{A,\mathcal{H}}) \cdot G^I_{\mathcal{H}_A} + P^I_{\mathcal{H}_A}$
  7.    B → A :    $n_B, x_B \cdot P^I_{A,I}, \text{MAC}(n_A)_{k'_{A,B}}$
  8.         A :    {Computes the pairwise key, analogously}
  9.    A → B :    $\text{MAC}(n_B \mid n_A)_{k'_{A,B}}$
 10.    B → A :    inter_session_ack, $\text{MAC}(n_A + 1)_{k'_{A,B}}$ Where the new symbol denotes:
                 I :    "Inter" domain
         $G^I_{\mathcal{Y}_X}$ :    Identity-based cryptosystem group
                        generator point of X's $\mathcal{Y}$ domain
               $x_X$ :    random number generated by X
inter_session_req, _ack :    request and acknowledgment labels
```

InterDomainKeyAgreement protocol

AoT entity software stack

FIG. 16

| Primitive | Computational Overhead | | Communication Overhead (B) |
|---|---|---|---|
| | Sender | Receiver | |
| ABS [38] | $(3+2l+2lt)\hat{e}$ | $(2lt+1)p+(lt+t+3)\hat{e}$ | $130+65l+129t$ |
| P. ABS [38] | $(3+2l+2lt)\hat{e}$ | $(2lt+t+2)p+(l+2)\hat{e}$ | $130+65l+129t$ |
| IBS [64] | $1p$ | $3p$ | 133 |
| IBE [29] | $1\hat{e}+2p$ | $1\hat{e}+1p$ | 129 |
| SOK [28] | $1\hat{e}$ | $1\hat{e}$ | 65 |

Table 1: Computational (number of pairings ($\hat{e}$), and point multiplications ($p$)) and communication overhead for AoT cryptographic primitives. For ABS, $l$ denotes the number of attributes and $t$ the number of 'and' operators in the predicate plus one. We compute communication overhead considering 8-byte nonces and 1-byte labels.

FIG. 17

| RESOURCE | A (e.g., G3) | B (e.g., Edison) | C (e.g., Due) |
|---|---|---|---|
| CPU | Arm A57 | Atom | Arm M3 |
| OS | Android 5.1 | Raspbian | None |
| Word size | 64 bits | 32 bits | 32 bits |
| Clock | 2 GHz | 500 MHz | 84 MHz |
| RAM | 3 GB | 1 GB | 96 KB |
| Storage | 32 GB | 4 GB | 512 KB |

Summary of devices used in experimental evaluation

Run times for asymmetric cryptographic primitives on the Due. We abbreviate encryption, decryption, signature generation, and signature verification. Run times for IBE and ABS use 1KB messages and the A ∧ B predicate, respectively.

Run times of ABS for different security levels (80 and 128 bits) and configurations (deterministic or probabilistic verification) on the Duc for predicate A ∧ B.

| OPERATION | A (e.g., G3) | B (e.g., Edison) | C (e.g., Due) |
|---|---|---|---|
| Point multiplication | 1.1 ± 0.2 | 10.9 ± 0.2 | 74.5 ± 1.3 |
| Pairing | 4.1 ± 0.7 | 88.4 ± 0.3 | 355.1 ± 1.0 |

Expensive cryptographic operations run times (ms).

Experimental and analytical
ABS verification run times on the Due for
varying predicate structure. Plotted combining Tables 1 and 3.

Experimental ABS verification run times and memory requirements on the Duo for varying predicate sizes and 100% AND operators (average over 30 runs).

Experimental and analytical
ABS verification run times on the Intel
Edison for varying predicate structures
(average over 30 runs).

SYSTEM AND METHOD FOR AUTHENTICATION OF THINGS

CROSS-REFERENCE TO RELATED APPLICATIONS

Pursuant to 35 U.S.C. § 119, this application claims the benefit of earlier filing date and right of priority to Korean Application No. 10-2016-0134394, filed on Oct. 17, 2016, and also claims the benefit of U.S. Provisional Application No. 62/287,832, filed on Jan. 27, 2016, the contents of which are all incorporated by reference herein in their entirety.

BACKGROUND OF THE INVENTION

Field of the Invention

The present invention relates to a system for authentication of things and a method of performing authentication of things.

Discussion of the Related Art

The Internet of Things (IoT) corresponds to a thing space connection network where all things form an intelligent relation using an information communication technology. In particular, the IoT corresponds to a technology and a service capable of being connected with each other via the Internet without being restricted by time, a place, and a type. The IoT corresponds to a technology and a service capable of appropriately processing and controlling information by monitoring surrounding situation, communicating and cooperating with each other without explicit human involvement. In this case, a thing corresponding to a main configuration element of the IoT can include not only a communication device (end-device) in wired/wireless network but also a physical thing consisting of a human, a vehicle, a bridge, various electronic devices, cultural assets, and natural environment, and the like.

The consumer electronics industry is witnessing a surge in Internet of Things (IoT) devices, ranging from mundane artifacts to complex biosensors connected across disparate networks. In particular, the Internet of Things (IoT) is now part of our daily lives. Projections suggest that we will soon be surrounded by billions of IoT-enabled devices. Yet, legacy authentication and access control mechanisms do not meet the growing needs of IoT.

In particular, as the demand for IoT devices grows, the need for stronger authentication and access control mechanisms is greater than ever. In particular, there is a dire need for a holistic authentication mechanism throughout the IoT device life-cycle, namely from the manufacturing to the retirement of the device.

Since sensors used for IoT have subminiature and low-power characteristic, it is required to have an authentication and access control mechanism smoothly operating in low power environment where computing power is not sufficient.

IoT combines physical objects (e.g., vehicles and appliances) with sensors and actuators in a cyber-physical system (e.g., smart cities, grids, and homes).

Authentication mechanisms enable parties to distinguish between forged and legitimate data, as well as to know with certainty who originated a message. Authentication is paramount to security.

For IoT, in particular, authentication enables access control, prevents sybil attacks attacking a system or a network with a plurality of identifiers, and mitigates Denial of Service (DoS) attempts. Authentication mechanism makes authentication a key security property for IoT.

Even though IoT security has received attention from the research community, existing approaches are not appropriate for IoT.

First, traditional schemes based on PM (public key infrastructure) and certificates incur significant CPU, memory, storage, communication, and management overheads unfit for IoT devices.

Second, IoT often requires devices from a given domain to safely interoperate with other devices belonging to multiple and different domains. Many authentication schemes that target resource-constrained devices assume devices belong to a single domain and thus cannot be directly applied to IoT.

Third, there is no mechanism able to provide authentication throughout the entire IoT device life-cycle.

As a result, there is a need for a system for authenticating things and a method of authenticating things exclusively tailored to meet IoT authentication requirements.

Although it is able to perform authentication and access control on IoT devices using PKS (public-key cryptosystem), since the PKS is very expensive, it is difficult to practically apply the PKS to the IoT devices.

Hence, it is required to develop a system for authenticating things and a method of authenticating things from which the problem of the related art is resolved.

SUMMARY OF THE INVENTION

Accordingly, an object of the present invention is to address the above-noted and other problems.

A technical task of one embodiment of the present invention is to provide an authentication and access control solution appropriate for IoT.

Another technical task of one embodiment of the present invention is to provide a suit of protocols providing authentication and access control throughout the entire IoT device life-cycle.

Another technical task of one embodiment of the present invention is to provide authentication and access control in cloud domain and home domain.

Another technical task of one embodiment of the present invention is to make a guest device authenticate itself from other external domain.

Another technical task of one embodiment of the present invention is to make a specific device join domain owned by the specific device and other domain and to make the specific device access operations of external devices by authenticating itself.

Another technical task of one embodiment of the present invention is to securely transfer ownership of a device.

The other technical task of one embodiment of the present invention is to execute authentication providing stronger security and access control.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, an AoT (Authentication Of Things) system includes a cloud server configured to control a cloud domain connected with a plurality of devices, a home server configured to control a home server connected with a plurality of devices, a first device corresponding to a new device, and a second device of a root user connected with the home domain while authentication is completed in the home server. In this case, the first device loads cryptographic material of the cloud server from the cloud server in a pre-deployment stage, the cryptographic material includes at least one selected from the group consisting of an identifier of the first device in the cloud server, a first private key of an ID-based cryptography system of the first device in the cloud server, a first pairwise key of the first device in the cloud server, and a counter of the first device, and if the first device is shipped to a trader, the cloud server deletes the first private key from the cloud server.

To further achieve these objects and other advantages and in accordance with the purpose of the invention, as embodied and broadly described herein, according to a different embodiment, a method of performing AoT (Authentication Of Things), includes the steps of loading cryptographic material of a cloud server, which is loaded by a first device corresponding to a new device from the cloud server controlling a cloud domain in a pre-deployment stage, and if the first device is shipped to a trader, deleting a first private key from the cloud server. In this case, the cryptographic material includes at least one selected from the group consisting of an identifier of the first device in the cloud server, a first private key of an ID-based cryptography system of the first device in the cloud server, a first pairwise key of the first device in the cloud server, and a counter of the first device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

A mobile terminal and method for controlling the same according to the present invention provide the following effects and/or features.

According to at least one or more embodiments of the present invention, it is able to provide an authentication and access control solution appropriate for IoT.

According to at least one or more embodiments of the present invention, it is able to provide a suit of protocols providing authentication and access control throughout the entire IoT device life-cycle.

According to at least one or more embodiments of the present invention, it is able to provide authentication and access control in cloud domain and home domain.

According to at least one or more embodiments of the present invention, it is able to make a guest device authenticate itself from other external domain.

According to at least one or more embodiments of the present invention, it is able to make a specific device join domain owned by the specific device and other domain and to make the specific device access operations of external devices by authenticating itself.

According to at least one or more embodiments of the present invention, it is able to securely transfer ownership of a device.

According to at least one or more embodiments of the present invention, it is able to execute authentication providing stronger security and access control.

Effects obtainable from the present invention may be non-limited by the above mentioned effect. And, other unmentioned effects can be clearly derived and understood from the following description by those having ordinary skill in the technical field to which the present invention pertains.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 4 is a diagram for explaining an example of a KeyAgreement protocol corresponding to an auxiliary protocol according to one embodiment of the present invention;

FIG. 5 is a diagram for explaining an example of a KeyIssue protocol corresponding to an auxiliary protocol according to one embodiment of the present invention;

FIG. 6 is a diagram for explaining an example of a Binding protocol corresponding to an auxiliary protocol according to one embodiment of the present invention;

FIG. 7 is a diagram for explaining an example of a main protocol used in a pre-deployment stage according to one embodiment of the present invention;

FIG. 8 is a diagram for explaining an example of a main protocol used in an ordering stage according to one embodiment of the present invention;

FIG. 9 is a diagram for explaining an example of a main protocol used in a deployment stage according to one embodiment of the present invention;

FIG. 10 is a diagram for explaining an example of a main protocol used in a functioning stage according to one embodiment of the present invention;

FIG. 11 is a diagram for explaining an example of a main protocol used in a retirement stage according to one embodiment of the present invention;

FIG. 12 is a diagram for explaining an example of a method of reassigning ownership of a device in a system for authentication of things (AoT) according to one embodiment of the present invention;

FIG. 13 is a diagram for explaining an example of a method of performing inter-domain operation in a system for authentication of things (AoT) according to one embodiment of the present invention;

FIG. 16 is a table for explaining a comparison result between time for performing AoT and communication overhead;

FIG. 17 is a table for illustrating performance of devices used in evaluating AoT according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

In the following, preferred embodiments for an AoT system and an AoT method according to the present invention are explained in detail with reference to the attached drawings.

In the present invention, an AoT system for providing an authentication mechanism for the entire IoT device life-cycle, i.e., a suite of cryptographic protocols that provides authentication and access control to all stages in a device's life-cycle is explained.

AoT according to one embodiment of the present invention may rely on Identity-Based Cryptography and Attribute-Based Cryptography to execute Attribute-Based Access Control (ABAC) using keys.

Figure 1:
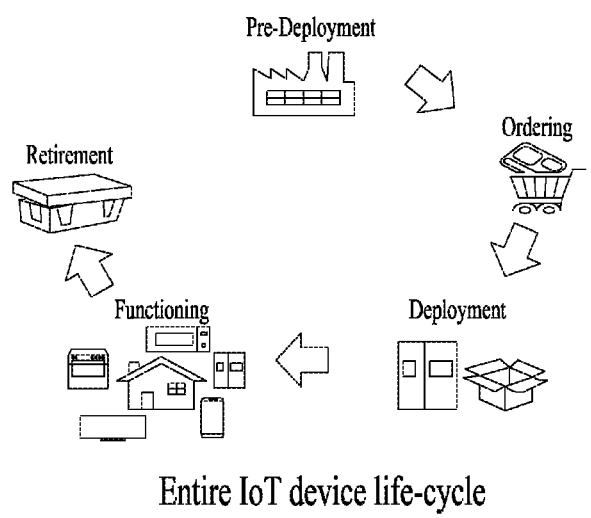
FIG. 1 is a diagram for explaining life cycle of an IoT device to which a system for authentication of things (AoT) is applied according to one embodiment of the present invention.

FIG. 1 is a diagram for explaining life cycle of an IoT device to which a system for authentication of things (AoT) is applied according to one embodiment of the present invention.

Referring to FIG. 1, a life cycle of an IoT device consists of pre-deployment, ordering, deployment, functioning, and retirement.

AoT can authenticate devices in multiple distinct domains.

AoT allows authenticated device interoperation across multiple domains.

Specifically, a device can join a foreign domain (i.e., a domain different from its own) and securely authenticate itself to access operations on devices in that domain. AoT also allows secure transfer of device ownership. Finally, AoT performs authentication and access control over wireless mediums, but provides stronger security than wireless authentication mechanisms widely deployed today (e.g., WPA2).

According to one embodiment of the present invention, AoT relies on Identity-Based Cryptography to distribute keys and authenticate devices as well as Attribute-Based Cryptography to cryptographically enforce Attribute-Based Access Control.

The aforementioned cryptosystems are selected because the cryptosystems are certificate-free and thus do not impose certificate-related overheads on devices.

Authentication

Authentication is the most important security property in IoT. One of authentication's major goals is to prevent illegitimate nodes from taking part in network activities. This can protect most network operations, unless legitimate nodes have been compromised.

Authentication includes source authentication and data authentication.

The source authentication guarantees a receiver that the message indeed originated from the claimed sender.

The data authentication prevents integrity violation and ensures that the message received is fresh.

Authentication can be achieved through the use of symmetric or asymmetric cryptosystems. More precisely, authentication can be achieved through the use of Message Authentication Codes (MACs) and Digital Signatures, respectively.

AoT leverages both MACs and Digital Signatures for authentication in its suite of protocols.

Attribute-Based Access Control

Access Control regulates who or what can perform an operation (e.g., read or write) on an object (e.g., a file).

Traditional access control models are inconvenient for IoT. For instance, Mandatory Access Control, Discretionary Access Control, and Role-Based Access Control are user centric and do not consider factors like resource information, relationship between the user (the requester) and the resource provider, and dynamic information (e.g., current time and user identifier). Moreover, in large scale networks like IoT deployments, it might be unmanageable for one to keep a list of who is granted access to what.

On the other hand, ABAC simplifies access control by replacing discretionary permissions with policies based on attributes. The ABAC model grants rights to users based on attributes like resource characteristics and contextual information. The idea is based on the observation that, in a given organization, permissions are often assigned to the attributes of users rather than to their identity. Attributes, in turn, are assigned to users according to their responsibilities or qualifications. In ABAC, the possession of an attribute can be easily altered without modifying the underlying access structure. And, new permissions can be conveniently granted to attributes as new objects or operations are incorporated into the system.

AoT may adopt ABAC as the paradigm to implement access control for IoT.

ID-based Cryptography (IBC)

The notion of IBC dates back to Shamir's original work, but it has only become practical with the advent of PBC (Pairing-Based Cryptography). The main advantage of IBC is that it does not require the expensive explicit public-key authentication. In these systems, users may have a meaningful public-key rather than a random string of bits and those keys can thus be derived from the user's public information. The public information intrinsically binds a user to its public-key, which makes other means of accomplishing this binding, e.g., digital certificates, unnecessary. Finally, IBC also allows secure communication between users of different IBC domains.

However, according to IBC, private-keys are not generated by their respective owners but rather by Private Key Generators (PKGs), i.e., those keys are not actually private. So, a PKG could, if it wanted to, impersonate any user in the system. In particular, a key escrow problem of identity-based systems may occur.

In IBC, private-keys must be delivered to the user over a secure channel. In IBC, bootstrap security is used.

In IBC, the cryptographic primitive that provides authentication is the Identity-Based Signature (IBS). AoT makes use of IBS in its suite of cryptographic protocols.

Attribute-Based Cryptography

ABC also known as Fuzzy ID-Based Cryptography. Hence, ABC also suffers from the key escrow problem. Compared to IBC, ABC focuses on groups of users rather than solely on users' identities. The cryptosystem relies on a subset of user attributes to control private-key ownership.

There are two classes of ABC schemes. One is Key-Policy ABC (KP) and another is Ciphertext-Policy ABC (CP). In the former, the policy is attached to private keys, and attributes annotate messages. In the latter, messages carry the policy and users possess a key for each of their respective attributes. In KP, the sender of a message has no control over who or what will be able to access the contents of his messages. CP, on the other hand, does allow this control.

In the context of signature schemes, CP is commonly referred to Policy-Endorsing Attribute-Based Signature. In this case, users are assigned a set of attributes and its corresponding private keys. A user's ability to perform operations over a message (e.g., sign a message) depends on the attribute set associated with the user as well as the policy associated with the message. To be concrete, messages carry a boolean expression of attributes called the signing policy or the predicate of the message. To verify a signature correctly, a user must sign the message using the keys associated with any subset of attributes that satisfies the predicate.

Meanwhile, a synergy may occur between ABC and ABAC. On the one hand, ABC is similar to ABAC in that both ABC and ABAC are based on user attributes. On the other hand, ABC and ABAC are also complementary, since ABC and ABAC may be combined so the ABC cryptographically enforces the ABAC.

According to one embodiment of the present invention, the CP (Ciphertext-Policy ABC) is adopted as the underlying cryptographic construction of AoT's access control mechanism.

Specifically, AoT employs ABC signatures during its most frequent operation and maps ABAC policies onto ABC predicates.

Pairing-Based Cryptography

Pairing-Based Cryptography makes existing cryptographic protocols both more efficient and convenient.

The bilinear pairing is the major cryptographic primitive in PBC. Pairings, for short, were first used in the context of cryptanalysis, but their pioneering use in cryptosystems is due the works of Sakai, Ohgishi, and Kasahara, Boneh and Franklin, and Joux.

In general, a bilinear pairing is a computable, nondegenerate function.

The nondegenerate function can be represented as follows.

$$\hat{e}: \mathbb{G}_1 \times \mathbb{G}_2 \rightarrow \mathbb{G}_T \qquad \text{[Equation 1]}$$

In equation 1, first group ($\mathbb{G}_1$) and second group ($\mathbb{G}_2$) are additively-written groups of order n with identity O, and third group ($\mathbb{G}_T$) is a multiplicatively-written group of order n with identity 1.

The Groups G1 and G2 are implemented using a group of points on certain elliptic curves and the third group (GT) is implemented using a multiplicative subgroup of a finite extension field. When the first group (G1) is identical to the second group (G2), the pairing is said to be symmetric, although symmetric pairing constructions are less efficient.

In PBC, the crucial property of pairings is bilinearity.

$$\hat{e}(aP, bQ) = \hat{e}(P, Q)^{ab} \forall P \in \mathbb{G}_1, Q \in \mathbb{G}_2 \text{ and } \forall a, b \in \mathbb{Z}_n. \quad \text{[Equation 2]}$$

AoT relies heavily on PBC. For instance, AoT makes use of pairings to distribute keys and to implement ABS.

In the following, in order to explain AoT according to embodiments of the present invention, assume the following. First, every message is numbered and carries the identifiers of the interlocutors. Second, cryptographic material can be securely loaded into devices at the manufacturer's facility. Third, PINs (Personal Identification Numbers) can be securely entered onto devices at home. Fourth, cryptographic primitives are ideal, i.e., flawless, and can be treated as black boxes.

According to one embodiment of the present invention, an AoT system can perform key distribution and access control using a new method different from existing method. In this case, the key distribution corresponds to key distribution to bootstrap security and the access control corresponds to access control to govern permissions over device operations.

The AoT system according to one embodiment of the present invention can use IBC (Identity-Based Cryptography) to perform the key distribution and can use ABC (Attribute-Based Cryptography) to control access to device operations.

In order to solve the key escrow problem of IBC (ID-Based Cryptography), it may use two-domain architecture. Regarding this, it is explained in more detail with reference to FIG. 2 in the following.

Figures 2, 3:
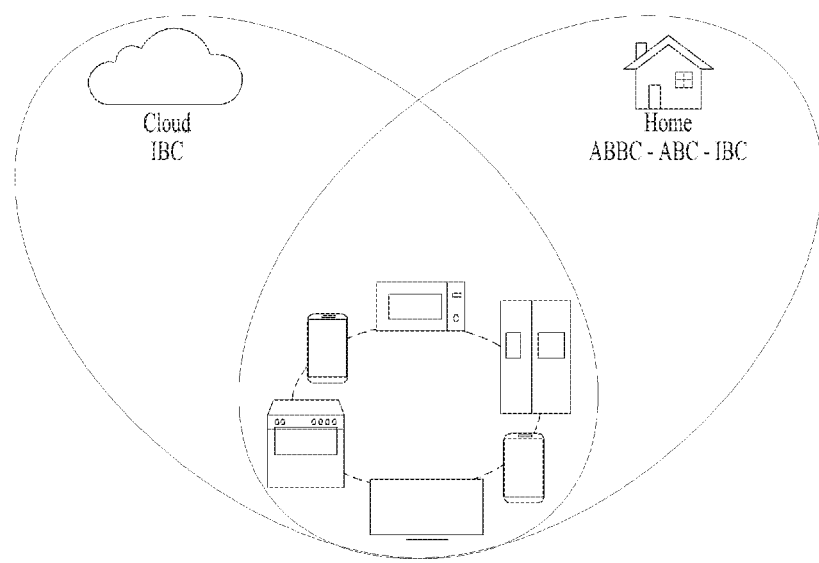
FIG. 2 is a diagram for explaining AoT two-domain architecture according to one embodiment of the present invention.
FIG. 3 is a diagram for explaining an example of a sessionKey procedure corresponding to an auxiliary procedure according to one embodiment of the present invention.

FIG. 2 is a diagram for explaining AoT two-domain architecture according to one embodiment of the present invention.

As shown in FIG. 2, if an architecture in which two domains exist is used, it may be able to solve the key escrow problem.

More precisely, it may be able to solve the key escrow problem using two distinct IBC setups including a manufacturer (Cloud) setup and a local (Home) setup.

They respectively define manufacturer-to-device and domestic device-to-device trusted relationships. In particular, a trusted relationship can be formed between a manufacturer and a device in the manufacturer setup and a trusted relationship can be formed between devices in the local setup.

In this case, there is no overlap in these trusted relationships and thus an artifact generated in the Cloud domain is invalid in the Home domain and vice-versa. Note that the key escrow still holds in each IBC setup individually.

However, the escrow now is no longer a problem in the architecture of two domains.

Specifically, for the Cloud's IBC keys escrow, this is because the user's privacy is preserved in that requests originated from the Cloud domain are null in the Home domain. For the Home's IBC and ABC keys escrows, the escrow will be held at a home device owned and managed, and thus trusted, by the household and its members.

According to one embodiment of the present invention, a suite of protocols cryptographically provides authentication and access control over wireless mediums.

According to one embodiment of the present invention, one of AoT's key features is the ability to deploy devices without resorting to cabled connections. Instead, AoT leverages a home's physical protection and a reliable device (e.g., the Home domain manager's smartphone) to bridge the very first communication between a new device and the Home server to bootstrap security.

According to one embodiment of the present invention, AoT delivers access control by combining ABAC and ABC. Specifically, the ABAC cryptographically enforces the ABC.

In this case, permission for operating a device is ultimately tied to the ABC attributes of a requester. And, the ABC attributes and predicates are governed by the higher-level ABAC policies.

Meanwhile, AoT according to one embodiment of the present invention may have extra features. For instance, AoT enables inter-domain interactions between devices on different Home domains, meaning that devices from different Home domains may interoperate seamlessly as long as their respective Home servers have previously agreed on some parameters.

In AoT according to one embodiment of the present invention, a suite of protocols also address device reassignment, enabling a user to trade or give away one or more of his devices. Finally, we explain how AoT achieves key revocation.

Auxiliary Procedure and Auxiliary Protocols

According to one embodiment of the present invention, auxiliary procedure and auxiliary protocol used in AoT can assist the main protocols used in AoT.

As an example, at least one of the auxiliary procedure and the auxiliary protocol used in AoT can help the main protocols to obtain a session key.

As a different example, at least one of the auxiliary procedure and the auxiliary protocol used in AoT can help the main protocols to exchange a common pairwise key.

As a further different example, at least one of the auxiliary procedure and the auxiliary protocol used in AoT can help the main protocols to distribute a private key. In this case, the private key corresponds to an attribute-based authentication key.

As a further different example, at least one of the auxiliary procedure and the auxiliary protocol used in AoT can help the main protocols to bind or unbind a device to a user in the Cloud domain. In this case, the binding means to tie up and the unbinding means to release the binding. For example, when a device is bound to a user, it may indicate that the device and the user are tied up together. When a device is unbound from a user, it may indicate that the device and the user tied up together are released.

In this case, the auxiliary procedure can include a Session Key procedure and the auxiliary protocol can include a Key Agreement protocol, a Key Issue protocol, a Binding protocol, and an Unbinding protocol. In the following, the auxiliary procedure and the auxiliary protocol are explained with reference to FIGS. 3 to 6.

In ABC, multiple devices may hold the same ABS key. Hence, ABS keys are often referred to as signing keys rather than private keys. For the sake of simplicity, the ABS keys are referred to as private keys in the following.

FIG. 3 is a diagram for explaining an example of a sessionKey procedure corresponding to an auxiliary procedure according to one embodiment of the present invention.

Session key according to one embodiment of the present invention corresponds to a cryptographic key used for a single communication session only between partners performing communication.

A pseudorandom function (PRF), a previously shared key (k), and a current counter (i) are very important to maintain a session key that is kept up-to-date in a session key procedure corresponding to an auxiliary procedure used in AoT according to one embodiment of the present invention. This idea is based on the work of Perrig.

The session key procedure is explained in more detail in the following.

In the session key procedure according to one embodiment of the present invention, a session key ($k^i$) corresponding to the current counter (i) can be obtained by performing a pseudorandom operation at the current counter (i) using the previously shared key (k) (step 1).

Meanwhile, after the session key ($k^i$) corresponding to the current counter is obtained, the current counter (i) can be increased by 1 (step 2).

After the current counter (i) is increased by 1, the operation of the step 1 can be performed again using the current counter (i) increased by 1.

In particular, according to the session key procedure in accordance with one embodiment of the present invention, as the counter is increased by 1, a session key corresponding to each counter can be generated via a pseudorandom function.

FIG. 4 is a diagram for explaining an example of a KeyAgreement protocol corresponding to an auxiliary protocol according to one embodiment of the present invention.

KeyAgreement according to one embodiment of the present invention corresponds to a scheme of securely sharing a session key on a public communication channel using a specific method without the contact between the sender of the session key and the receiver of the session key.

KeyAgreement according to one embodiment of the present invention is based on the work of Sakai, Ohgishi, and Kasahara.

KeyAgreement runs a key agreement protocol according to one embodiment of the present invention between any two devices on the same Home domain ($\mathcal{H}$). In the following description, assume that a first device (A) and a second device (B) exists on the same Home domain ($\mathcal{H}$).

The key agreement protocol makes use of pairings for computing a pairwise key between the first device (A) and the second device (B) and counters for generating unique session keys.

The key agreement protocol can also carry out a mutual challenge-response message exchange between the first device (A) and the second device (B) (steps 1, 6, and 8).

This sort of challenge-response message exchange can be reproduced in other AoT protocols to ensure freshness and prevent replay attacks.

The key agreement protocol according to one embodiment of the present invention is explained in more detail in the following.

According to the key agreement protocol according to one embodiment of the present invention, the first device (A) can transmit a first random nounce ($n_A$) generated in the first device (A) and a session request (session_req) to the second device (B) (step 1).

The second device (B) can obtain a public key ($P^{pk}_{A,\mathcal{H}}$) of the first device on the Home domain. In this case, the public key ($P^{pk}_{A,\mathcal{H}}$) corresponds to a public key in ID-based Cryptography (IBC). Specifically, the second device can obtain the public key ($P^{pk}_{A,\mathcal{H}}$) by mapping an ID ($id_{A,\mathcal{H}}$) of the first device in the Home domain (step 2).

The second device (B) can obtain a first pairwise key ($k_{A,B}^{-}$) shared between the first device (A) and the second device (B).

Specifically, the first pairwise key ($k_{A,B}^{-}$) can be obtained by cryptographically performing bilinear pairing on a private key ($S^{sk}_{B,\mathcal{H}}$) of the second device and the public key ($P^{pk}_{A,\mathcal{H}}$) in the Home domain (step 3). In this case, the private key ($S^{sk}_{B,\mathcal{H}}$) corresponds to a private key in IBC.

The second device (B) can set the counter ($c_A$) to 0 (step 4).

The second device (B) can obtain a second pairwise key ($k_{A,B}^{i}$) shared in an $i^{th}$ session corresponding to the counter ($C_A$) between the first device and the second device.

Specifically, the second device (B) can obtain the second pairwise key ($k_{A,B}^{i}$) using the first pairwise key ($k_{A,B}^{-}$) and the counter ($c_A$) in the session key procedure mentioned earlier in FIG. 3. In particular, the second device (B) can obtain the second pairwise key ($k_{A,B}^{i}$) by performing pseudorandom function on the counter ($c_A$) using the first pairwise key ($k_{A,B}^{-}$).

For example, since the counter ($c_A$) is set to 0, the second device (B) can obtain a pairwise key between the first device (A) and the second device (B) in a $0^{th}$ session by performing pseudorandom function on the counter 0 using the first pairwise key ($k_{A,B}^{-}$).

Meanwhile, the second device (B) can transmit a first message authentication code of a message to which the first random nounce ($n_A$) is attached to the first device (A) using the second pairwise key ($k_{A,B}^{i}$). And, the second device (B) can also transmit a second random nounce generated by the second device to the first device (A) (step 6).

Meanwhile, the first device (A) can similarly compute the second pairwise key ($k_{A,B}^{i}$) (step 7).

The first device (A) can generate a specific value by concatenating the first random nounce and the second random nounce. The first device (A) can transmit a second message authentication code to the second device (B). In this case, the second message authentication code may correspond to a message authentication code of a message to which the specific value is attached using the similarly computed second pairwise key ($k_{A,B}^{i}$)(step 8).

The second device (B) can transmit a session response (session_ack) to the first device (A) in response to the session request (session_req). And, the second device (B) can transmit a third message authentication code to the first device (A). In this case, the third message authentication code may correspond to a message authentication code of a message to which a value of which 1 is added to the first random nounce is attached using the second pairwise key ($k_{A,B}^{i}$) (step 9).

FIG. 5 is a diagram for explaining an example of a KeyIssue protocol corresponding to an auxiliary protocol according to one embodiment of the present invention.

According to one embodiment of the present invention, KeyIssue issues a private key for a device (D) on a server (S), a domain (Z), and a cryptosystem (Y). The issuing is secured using a session key derived from a pairwise key previously shared between the device (D) and the server (S).

Key issuing according to one embodiment of the present invention is explained in more detail in the following.

The device (D) can generate a first random nounce ($n_D$). The device (D) can transmit the first random nounce ($n_D$) and a key issue request (issue_req) to the server (S) (step 1).

The server (S) can transmit a first message authentication code to the device (D). In this case, the first message authentication code may correspond to a message authentication code of a message to which the first random nounce ($n_D$) is attached using a pairwise key ($k_{D,S}^{i}$) shared between the device (D) and the server (S) in an $i^{th}$ session. And, the server (S) can also transmit a second random nounce ($n_S$) generated in the server (S) to the device (D) (step 2).

The device (D) can generate a specific value by concatenating the first random nounce and the second random nounce. And, the device (D) can transmit a second message authentication code to the server (S) (step 3). In this case, the second message authentication code may correspond to a message authentication code of a message to which the specific value is attached using the pairwise key ($k_{D,S}^{i}$).

The server (S) can generate a specific value in a manner of cryptorizing a private key ($S^{sk}_{R,Z}$) of the device (D) using the pairwise key ($k_{D,S}^{i}$) in the domain (Z). In this case, the private key ($S^{sk}_{R,Z}$) corresponds to a private key of the cryptorizing scheme (Y). And, the server (S) can transmit a third message authentication code to the device (D). In this case, the third message authentication code may correspond to a message authentication code of a message to which a value of which 1 is added to the first random nounce ($n_D$) is attached using the pairwise key ($k_{D,S}^{i}$). And, the server (S) can also transmit the cryptorized specific value and a response (issue_ack) corresponding to the issue request to the device (D) (step 4).

FIG. 6 is a diagram for explaining an example of a Binding protocol corresponding to an auxiliary protocol according to one embodiment of the present invention.

According to one embodiment of the present invention, binding binds a device (D) to a user (U) in the Cloud domain. Briefly, the device (D) asks the Cloud server (C) to be bound to the user (U). Communication from the Cloud server (C) to the device (D) is authenticated using message authentication codes (step 2 and 5).

The device (D), conversely, employs IBC digital signatures to authenticate the device (D) on the Cloud server (C).

Binding protocols according to one embodiment of the present invention is explained in more detail in the following.

The device (D) can generate a first random nounce ($n_D$). The device (D) can transmit the first random nounce ($n_D$) and a binding request to the Cloud server (C) (step 1).

The Cloud server (C) can generate a second randon nounce ($n_C$). The Cloud server (C) transmit a first message authentication code and the second randon nounce ($n_C$) to the device (D). In this case, the first message authentication code may correspond to a message authentication code of a message to which the first random nounce ($n_D$) is attached using a pairwise key ($k_{D,C}^i$) shared between the device (D) and the Cloud server (C) in an $i^{th}$ session. (step 2).

The device (D) can generate a specific value by concatenating the first random nounce ($n_D$) and the second randon nounce ($n_C$). And, the device (D) can transmit a signature of a message to which the specific value is attached using a private key ($s_{D,C}^i$) of the device (D) in the Cloud server (C), an ID ($id_{D,C}^i$) of a user in the Cloud server (C), and a bind command to the Cloud server (C) (step 3). In this case, the privaye key ($s_{D,C}^i$) corresponds to a privaye key in IBC (I).

The Cloud server (C) binds the user (U) to the device (D) (step 4).

And, the Cloud server (C) can transmit a binding response (bind_ack) corresponding to the binding request and a second message authentication code to the device (D). In this case, the second message authentication code may correspond to a message authentication code of a message to which a value of which 1 is added to the first random nounce ($n_D$) is attached using the pairwise key ($k_{D,C}^i$) (step 5).

Meanwhile, according to one embodiment of the present invention, unbinding protocol used in AoT is analogous to and performs the same steps as the Binding protocol. The only difference is that it unbinds rather than binds the device (D) and the user (U).

Meanwhile, a life cycle of an IoT device includes a pre-deployment stage, an ordering stage, a deployment stage, a functioning stage, and a retirement stage at least.

Pre-deployment

According to one embodiment of the present invention, pre-deployment takes place at the factory. A main protocol used for pre-deployment is explained in more detail in the following with reference to FIG. 7.

FIG. 7 is a diagram for explaining an example of a main protocol used in a pre-deployment stage according to one embodiment of the present invention.

The pre-deployment stage loads the Cloud domain's cryptographic material into devices.

In the pre-deployment stage, the Cloud server (C) generates an ID ($id_{D,C}$) of a device (D) (step 1). Specifically, the ID ($id_{D,C}$) may correspond to a serial number of the device.

The Could server (C) obtains a private key ($S_{D,C}^I$) of the device (D) in the Cloud server (C). In this case, the private key ($S_{D,C}^I$) can be generated using a mapping result of the ID ($id_{D,C}$) and a secret parameter in IBC (I) corresponding to a cryptography of the Cloud server (C) domain.

The Cloud server (C) can generate a pairwise key ($k_{D,C}$) which is shared between the Cloud server (C) and the device (D). The Cloud server (c) generates a counter ($c_D$) and sets the counter to 0. And, the Cloud server (C) loads the pairwise key ($k_{D,C}$) the counter ($C_D$), the ID ($id_{D,C}$), and the private key ($S_{D,C}^I$) in tandem with all the remaining cryptographic material into the device (D) (step 3). In this case, the loading is secured via a physical channel while ensuring the communication is both confidential and authenticated.

Finally, the Cloud server (C) deletes the private key ($S_{D,C}^I$) and ships the device (D) to a trader ($T_D$) (step 4). In particular, a manufacturer of the device (D) can safely ship the device (D) to the trader ($T_D$) of the device.

The pre-deployment stage is briefly explained in the following.

In the pre-deployment stage, the device (D) can load cryptographic materials of the Cloud server (c) from the Cloud server. When the device (D) is shipped to the trader, the Cloud server (C) can delete the private key ($S_{D,C}^I$) among the cryptographic materials of the Cloud server (c).

Ordering

Ordering illustrates a user (U) ordering a device (D) from a trader ($T_D$). Regarding this, it is explained in more detail in the following with reference to FIG. 8.

FIG. 8 is a diagram for explaining an example of a main protocol used in an ordering stage according to one embodiment of the present invention.

According to one embodiment of the present invention, all digital communication is secured via TLS (Transport Layer Security).

The user (U) places the order and pays for the device (step 1).

If the trader ($T_D$) receives the order from the user (U) and gets paid for the device (D), the trader ($T_D$) can transmit PIN (Personal Identification Number) to the user (U) (step 2).

The trader ($T_D$) can ship the device (D) out to the home of the user (U) (step 3).

The PIN ($pin_D$) will be used in the Deployment stage of an IoT device to grant access to a device. Regarding this, it is explained in more detail in the following with reference to FIG. 9.

Deployment

Deployment bootstraps the security of devices in their Home domains. The Deployment stage is the most important stage in AoT. Regarding this, it is explained in more detail in the following with reference to FIG. 9.

FIG. 9 is a diagram for explaining an example of a main protocol used in a deployment stage according to one embodiment of the present invention.

In the Deployment stage, a root user ($U_r$) and a personal device ($D_{U_r}$) of the root user play a key role. More precisely, the personal device ($D_{U_r}$) of the root user acts like a trusted bridge between a Home server and a device deployed to the Home server.

According to AoT of the present invention, in order to set up a new device (D), the root user ($U_r$) enters PIN ($pin_D$) of the device (D) onto the device (D) itself (step 1).

The personal device ($D_{U_r}$) of the root user can transmit a first iD ($id_{U_r,\mathcal{H}}$) of the root user in the domain ($\mathcal{H}$), a public key ($P_{\mathcal{H},\mathcal{H}}^i$) of the Home server (H) in the domain ($\mathcal{H}$), and the domain counter ($c_{\mathcal{G}_\mathcal{H}}$) to the device (D) (step 2). In this case, the public key ($P_{\mathcal{H},\mathcal{H}}^i$) corresponds to a public key of IBC and the counter ($c_{\mathcal{G}_\mathcal{H}}$) can provide freshness for broadcasts originated from the home server (H).

Subsequently, the device (D) can generate an ephemeral (i.e., valid for only a short period) first pairwise key ($k_{D,H}$)

shared between the device (D) and the Home server (H). In this case, the device (D) can encrypt the first pairwise key ($k_{D,H}$) using the public key ($P^i_{H,\mathcal{H}}$). And, the device (D) can send the resulting cipertext of the first pairwise key ($k_{D,H}$) to the personal device ($D_{U_r}$) of the root user (step 3).

Specifically, the device (D) can transmit the cipertext of $$(ENC(k_{D,H})_{P^i_{H,\mathcal{N}}})$$

of the first pairwise key, a second ID ($id_{D,\mathcal{H}}$) and a type of the device (D) in the domain ($\mathcal{H}$), and information ($info_D$) on operations supported by the device (D) to the device ($D_{U_r}$) of the root user.

Meanwhile, the root user ($U_r$) uses the personal device ($D_{U_r}$) of the root user to set attributes ($\mathbb{A}_D$) of the device (D) and the predicates ($\mathcal{W}_D$) of the device (step 4). In this case, the attributes ($\mathbb{A}_D$) and the predicates ($\mathcal{W}_D$) should be satisfied to execute operations on the device (D).

Communication used in the steps 1 to 4 is made via a specific channel. In this case, the specific channel is not only secure but adequate for the device (D) being deployed.

According to one embodiment of the present invention, since the Deployment protocol runs behind closed doors (i.e., at the device owner's home), transmission mechanisms (e.g., scanning QR codes) could be carefully employed to exchange data securely.

According to one embodiment of the present invention, the Deployment protocol permits one to set up even bulky devices (like a fridge) without resorting to a cabled connection or requiring that the device is physically close to the Home server.

The Deployment protocol proceeds with the personal device ($D_{U_r}$) of the root user requesting the deployment of the device (D) to the Home server (H).

Specifically, the personal device ($D_{U_r}$) of the root user can transmit a first random nounce $$(n_{D_{U_r}})$$

generated by the personal device of the root user and a deployment request (deploy_req) to the Home server (H) (step 5). The Deployment protocol can continuously proceed while the deployment request (deploy_req) is transmitted to the home server (H) by the personal device ($D_{U_r}$) of the root user.

The Home server (H) can generate a second pairwise key $$(k^i_{D_{U_r}}, H)$$

shared between the personal device ($D_{U_r}$) of the root user and the Home server (H) in an $i^{th}$ session. Subsequently, the Home server (H) can transmit a second random nounce ($n_H$) generated in the Home server and a first message authentication code to the personal device ($D_{U_r}$) of the root user. In this case, the first message authentication code may correspond to a message authentication code of a message to which the first random nounce $$(n_{D_{U_r}})$$

is attached using the second pairwise key $$(k^i_{D_{U_r}}, H)$$

(step 6).

The personal device ($D_{U_r}$) of the root user can transmit information received from the device (D) and the root user ($U_r$) to the Home server (step 7). In this step, the personal device ($D_{U_r}$) of the root user acts like an authentication bridge between the new device (D) and the Home server. In particular, the personal device ($D_{U_r}$) of the root user performs encryption and blindly signs the recently generated pairwise key between the Home server (H) and the device (D). Finally, the personal device ($D_{U_r}$) of the root user can send the resulting ciphertext to the Home server (steps 5-7).

More specifically, the personal device ($D_{U_r}$) of the root user can generate a specific value by concatenating the first random nounce $$(n_{D_{U_r}})$$

and the second random nounce ($n_H$) Subsequently, the personal device ($D_{U_r}$) of the root user can generate a signature $$\left(SIG(n_H \mid n_{D_{U_r}})_{s^I_{D_{U_r},\mathcal{H}}}\right)$$

of a message to which the specific value is attached using a first private key $$(s^I_{D_{U_r},\mathcal{H}})$$

of the personal device ($D_{U_r}$) of the root user in the domain ($\mathcal{H}$). In this case, the first private key $$(s^I_{D_{U_r},\mathcal{H}})$$

corresponds to a private key in IBC (I). And, the personal device ($D_{U_r}$) of the root user can transmit a deployment command, the second ID ($id_{D,\mathcal{H}}$), the attributes ($\mathbb{A}_D$), the predicates ($\mathcal{W}_D$) the information ($info_D$), the ciphertext $$\left(ENC(k_{D,H})_{P^i_{H,\mathcal{H}}}\right),$$

and the signature $$\left(SIG(n_H \mid n_{D_{U_r}})_{s^I_{D_{U_r},\mathcal{H}}}\right)$$

to the Home server (H). In particular, the personal device of the root user can transmit information received from the new device and the root user to the Home server (H).

Although the device (D) relies on the personal device ($D_{U_r}$) of the root user to carry out the communication, the device (D) does not trust the personal device ($D_{U_r}$) of the root user to exchange cryptographic material.

Meanwhile, in the steps 8 to 11, the Home server (H) can issue IBC and ABC private keys to the device (D). In this case, the issuing is secured using the first pairwise key ($k_{D,H}$). Regarding this, it is explained in more detail in the following.

The Home server (H) can obtain a second private key ($S^i_{D_U,\mathcal{H}}$) of a user device ($D_U$) in the domain ($\mathcal{H}$). In this case, the second private key ($S^i_{D_U,\mathcal{H}}$) corresponds to a private key of IBC. Specifically, the second private key ($S^i_{D_U,\mathcal{H}}$) can be generated using a mapping result ($id_{D_U,\mathcal{H}}$) of a third ID ($id_{D_U,\mathcal{H}}$) of the user device ($D_U$) in the domain ($\mathcal{H}$) and a secret parameter of IBC (I) in the domain ($\mathcal{H}$) (step 8).

The Home server (H) can obtain a third private key ($S^a_{D_U,\mathcal{H}}$) of the user device ($D_U$) in the domain ($\mathcal{H}$). In this case, the third private key ($S^a_{D_U,\mathcal{H}}$) corresponds to a private key of ABC (A). Specifically, the third private key ($S^a_{D_U,\mathcal{H}}$) can be generated using a mapping result ($\mathbb{A}_{D_U}$) of the attributes ($\mathbb{A}_{D_U}$) and a secret parameter of ABC (A) in the domain ($\mathcal{H}$) (step 9).

Meanwhile, the device (D) can perform key issuing in IBC (I) using the KeyIssue protocol mentioned earlier in FIG. 5. In this case, the server (S) of FIG. 5 corresponds to the Home server (H), the domain (Z) corresponds to the Home domain ($\mathcal{H}$), and the encruption scheme (Y) may correspond to the IBC (I) (step 10).

Meanwhile, the device (D) can perform key issuing in ABC (A) using the KeyIssue protocol mentioned earlier in FIG. 5. In this case, the server (S) of FIG. 5 corresponds to the Home server (H), the domain (Z) corresponds to the Home domain ($\mathcal{H}$), and the encruption scheme (Y) may correspond to the ABC (A) (step 11).

Meanwhile, the Home server (H) can broadcast information including respective attribute and predicate of all devices belonging to the Home server to all devices in the Home server including the device (D) (step 12). In this case, the device (D) is granted access to the Internet through the Home domain's Wi-Fi router.

Specifically, the Home server (H) can broadcast signature $$\left(SIG_{S^i_{H,\mathcal{H}}}\right)$$

of a message, which is recognized using predicates ($\mathbb{Y}_{C_H}$) of devices constructing the Home server, types of the devices constructing the Home server, information $$\left(info_{C_H}\right)$$

on operations supported by the devices, the counter ($C_{C_H}$), and a fourth private key ($S^i_{H,\mathcal{H}}$) of the Home server in the Home domain, to the devices ($C_H$) included in the Home server. In this case, the fourth private key ($S^i_{H,\mathcal{H}}$) corresponds to a privaye key of IBC.

Meanwhile, the device (D) binds itself to the root user ($U_r$) (step 13). In this case, if it is assumed that the device (D) is home appliance or shared device, the device (D) is bound to the root user ($U_r$). In this case, the biding can be achieved via the Binding protocol mentioned earlier in FIG. 6. In particular, the device of FIG. 6 corresponds to the device (D) and a user may correspond to the root user ($U_r$).

Meanwhile, the Home server (H) can transmit a deployment response (deploy_ask) corresponding to the deploy request and a second message authentication code to a personal device ($D_{U_r}$) of the root user. In this case, the second message authentication code may correspond to a message authentication code of a message to which a value of which 1 is added to the first random nounce $$\left(n_{D_{U_r}}\right)$$

is attached using the second pairwise key $$\left(k^i_{D_{U_r},H}\right)$$

(step 12).

According to the present embodiment, the personal device ($D_{U_r}$) of the root user plays a key role in the whole process of the deployment stage. Hence, the personal device ($D_{U_r}$) of the root user should be deployed to the Home server (H) using a secure channel. Hence, the personal device ($D_{U_r}$) of the root user should be deployed to the server using cabled connection such as USB or the like. This procedure can be performed only once.

The deployment stage is briefly explained in following.

If PIN of a device (D) is inputted to the device, the device (D) can receive the first ID ($id_{U_r,\mathcal{H}}$), the public key ($P^i_{H,\mathcal{H}}$), and the counters ($C_{C_H}$) from the personal device ($D_{U_r}$) of the root user. The device (D) generates the first pairwise key ($k_{D,H}$) valid for a predetermined period, encrypts the first pairwise key ($k_{D,H}$) using the public key ($P^i_{H,\mathcal{H}}$), and transmits the ciphertext $$\left(ENC(k_{D,H})_{P^i_{H,\mathcal{H}}}\right)$$

of the encrypted first pairwise key to the) personal device ($D_{U_r}$) of the root user. The personal device ($D_{U_r}$) of the root user receives first information on attributes ($\mathbb{A}_D$) of the device (D) and predicates ($\mathbb{Y}_D$) of the device (D) from a user and may be then able to transmit a deployment command of the device (D), the first information, and the ciphertext $$\left(ENC(k_{D,H})_{P^i_{H,\mathcal{H}}}\right)$$

to the Home server. The Home server (H) can issue the second private key ($S^i_{D_U,\mathcal{H}}$) and the third private key ($S^a_{D_U,\mathcal{H}}$) to the device (D). Subsequently, the Home server (H) can broadcast second information including a plurality of devices connected to the home domain, attributes of the device (D), and the predicates of the device to the device (D) and a plurality of the devices. In this case, having received the second information, the device is bound to the root user.

Functioning

AoT according to one embodiment of the present invention can govern the normal operation of devices. Regarding this, it is explained in more detail in the following with reference to FIG. 10.

FIG. 10 is a diagram for explaining an example of a main protocol used in a functioning stage according to one embodiment of the present invention.

In the protocol, a user (U) may make a request for performing a specific operation in a second device (B) using a first device (A) (step 1). For example, the user (U) can input a request for watching an image captured by an internal camera of a smart fridge to a smartphone of the user to watch the image using the smartphone of the user.

The first device (A) can transmit a first random nounce ($n_A$) generated in the first device and a request (op_req) of the specific operation to the second device (B) in response to the request of the user (U) (step 2).

Meanwhile, the second device (B) can transmit predicate of the specific operation to the first device in response to the request of the specific operation (step 3). Specifically, the second device (B) can transmit predicates ($T_{op}$) of the specific operation, a second randon nounce ($n_B$) generated in the second device, and a first message authentication code to the first device (A). In this case, the first message authentication code may correspond to a message authentication code of a message to which the first random nounce ($n_A$) is attached using a pairwise key ($k_{A,B}^i$) shared between the first device (A) and the second device (B) in an $i^{th}$ session.

The first device (A) can prove an execution right of the specific operation by singing a request of an attribute sub set that satisfies the predicates.

Specifically, the first device (A) can generate a specific value by concatenating the first random nounce ($n_A$) and the second randon nounce ($n_B$). Subsequently, the first device (A) can transmit a signature $$\left(SIG(n_B \mid n_A)_{S_{A,\mathcal{H}}^A}\right)$$

of a message to which the specific value is attached and a command for performing the specific operation to the second device (B) using a private key ($S_{A,\mathcal{H}}^A$) of the first device (A) in the home domain ($\mathcal{H}$). In this case, the private key ($S_{A,\mathcal{H}}^A$) may correspond to a private key in ABC (A) (step 4).

The second device (B) checks whether or not the signature received from the first device (A) satisfies the predicates. If the signature satisfies the predicates, the second device can execute the requested specific operation (step 5).

The second device (B) can transmit a response (op_ack) for the specific operation and a second message authentication code to the first device (A) after the specific operation is executed. In this case, the second message authentication code may correspond to a message authentication code of a message to which a value of which 1 is added to the first random nounce ($n_A$) is attached using the pairwise key ($k_{A,B}^i$).

The functioning stage is briefly explained in the following.

If the first device (A) receives an input for indicating a specific operation to be performed in the second device (B), the first device (A) can transmit a request for performing the specific operation to the second device (B). The second device (B) can transmit predicates ($T_{op}$) of the specific operation to the first device (A) in response to the request. The first device (A) can transmit a signature $$\left(SIG(n_B \mid n_A)_{S_{A,\mathcal{H}}^A}\right)$$

satisfying the predicates ($T_{op}$) to the second device (B) together with an execution command of the specific operation. If the received signature $$\left(SIG(n_B \mid n_A)_{S_{A,\mathcal{H}}^A}\right)$$

satisfies the predicates, the second device (B) can execute the specific operation according to the execution command of the specific operation.

Retirement

According to one embodiment of the present invention, a retirement stage is simple and special. The protocol of the retirement stage is analogous to Functioning. Regarding this, it is explained in more detail in the following with reference to FIG. 11.

FIG. 11 is a diagram for explaining an example of a main protocol used in a retirement stage according to one embodiment of the present invention. The retirement stage has a protocol similar to that of the functioning stage. In the following, a point different from FIG. 10 is mainly described.

To run Retirement, a user (U) employs a first device (A) to request the retirement of a second device (B). The retirement is performed if attributes of the first device (A) satisfy the predicate. In this case, assume that the second device (B) is owned by the user (U).

The second device (B) unbinds itself from the user (U) (step 2). This unbinding can be performed by the aforementioned unbinding protocol.

Meanwhile, the second device (B) can delete all keys of the second device from both the Cloud domain (C) and the Home domain ($\mathcal{H}$) (step 3). Specifically, the second device (B) can delete a first private key ($S_{B,C}^I$) of the second device in the Cloud server (C), a second private key ($S_{B,\mathcal{H}}^I$) of the second device in the Home domain, a third private key ($S_{B,\mathcal{H}}^A$) of the second device in the Home domain, and a pairwise key ring of the second device (B) from both the Cloud domain (C) and the Home domain ($\mathcal{H}$). In this case, the first private key and the second private key correspond to private keys in IBC and the third private key corresponds to a privet key in ABC.

The second device (B) can display such a message as "retired" when the retirement is completed (i.e., when the deletion is completed) (step 4). In particular, the message can play a role of a retirement response.

If the retirement for the second device (B) is completed, the second device (B) can no longer be used in the Home domain ($\mathcal{H}$).

The Retirement stage is explained in more detail in the following.

If the first device (A) receives a retirement request for the second device (B) from a user, the first device (A) can transmit a retirement request to the second device (B). The second device (B) can transmit predicates related to retirement proceeding to the first device. The first device can transmit a signature satisfying the predicates to the second device together with a retirement command. If the received signature satisfies the predicates, the second device can unbind the user from the second device (B) according to the retirement command. The second device (B) can delete the first private key ($S_{B,C}^I$), the second private key ($S_{B,\mathcal{H}}^I$), the third private key ($S_{B,\mathcal{H}}^I$), and the pairwise key ring from both the Cloud domain (C) and the Home domain ($\mathcal{H}$). And, the second device can output a message indicating that the retirement is completed on a screen when the deletion is completed.

Extra Features

Meanwhile, AoT according to one embodiment of the present invention can handle device ownership transfer, access revocation, and guest access. Regarding this, it is explained in more detail in the following.

Device Ownership Reassignment

FIG. 12 is a diagram for explaining an example of a method of reassigning ownership of a device in a system for authentication of things (AoT) according to one embodiment of the present invention.

According to one embodiment of the present invention, device ownership reassignment indicates that a first user (U) transfers ownership of a second device (B) to a second user (V) different from the first user (U).

The protocol related to the ownership reassignment is similar to the Retirement stage mentioned earlier in FIG. 11. Yet, according to the ownership reassignment, Cloud domain keys stored in the second device (B) are not deleted from the second device (B).

Specifically, the first user (U) can make a request for reassigning ownership of the second device (B) using a first device (A) (step 1).

The second device (B) unbinds itself from the first user (U). This can be performed using the aforementioned Unbinding protocol (step 2).

The second device (B) can delete all keys of the second device from the Home domain ($S_{B,\mathcal{H}}^I$) (step 3). Specifically, the second device (B) can delete a first private key ($S_{B,\mathcal{H}}^I$) of the second device (B), a second private key ($S_{B,\mathcal{H}}^I$) of the second device (B), and a pairwise key ring of the second device (B) from the Home domain ($\mathcal{H}$). In this case, the first private key ($S_{B,\mathcal{H}}^I$) corresponds to a private key in IBC and the second private key ($S_{B,\mathcal{H}}^I$) corresponds to a private key in ABC.

If all keys are deleted from the Home domain ($\mathcal{H}$), the second device (B) can display such a message as "ownership reassigned" on a screen (step 4). The message can play a role of a response for the ownership reassignment request.

Meanwhile, when the reassignment is performed, the first user (U) can p n transmit a new access PIN (pin$_D$) to the second user (V). In this case, the PIN (pin$_D$) transmitted to the second user (V) may correspond to PIN used for accessing the second device (B) (step 5).

Finally, the first user (U) can safely ship the second device (B) to the second user (V) (step 6).

The device ownership reassignment is explained in more detail in the following.

If the first device (A) receives an ownership reassignment request for the second device (B) from a user, the first device (A) can transmit the ownership reassignment request to the second device (B). The first device can transmit a signature satisfying predicate of the ownership reassignment to the second device together with an ownership reassignment command. If the received signature satisfies the predicate, the second device (B) unbinds itself from the first user (U) according to the ownership reassignment command. The second device (B) can delete the first private key ($S_{B,\mathcal{H}}^I$), the second private key ($S_{B,\mathcal{H}}^I$), and the pairwise key ring from the Home domain ($\mathcal{H}$). Subsequently, the first device can output a message indicating that the ownership reassignment is completed on a screen.

Key Revocation

Revocation is not the main focus of AoT. In spite of that, as a revocation mechanism in AoT, it may follow the scheme proposed by Boneh and Franklin and later improved by Boldyreva.

The Key revocation consists of associating keys with their respective expiring dates (e.g., a timestamp), so the dates become invalid after a given period of time.

A public key of a device (D) becomes a map of an ID of the device concatenated with a timestamp (e.g., $P_{D,X}^1 \approx \text{MAP}(\text{id}_{D,X}|\text{timestamp})$) in X domain. More specifically, the public key may correspond to a key that the ID of the device (D) and the time stamp are mapped in the X domain. In this case, the public key corresponds to a public key in IBC (I).

The granularity of the timestamp can be set by the Home or Cloud servers. For instance, keys may be renewed on a daily basis.

In the Key revocation stage, keys are instantly revoked as soon as time stamps of the keys expire.

Inter-domain (Guest) Operation

FIG. 13 is a diagram for explaining an example of a method of performing inter-domain operation in a system for authentication of things (AoT) according to one embodiment of the present invention. In the following, assume that a first device (A) corresponds to a device intending to access operations of a second device (B) as a guest device and the second device (B) corresponds to a device belonging to a domain different from a domain to which the first device (A) belongs thereto.

According to one embodiment of the present invention, an inter-domain operation allows a first device (A) from a foreign Home domain (i.e., a guest) to agree on keys and thus interoperate with devices from a local Home domain.

The Inter-domain operation protocol is based on the work of McCullagh and Barreto.

The Inter-domain key agreement protocol requires the two Home domains to agree on a public parameter of their Identity-Based Cryptosystems as well as a first group generator point ($G_{\mathcal{H}}^1$) and a second group generator point ($G_{\mathcal{H}}^2$) before inter-domain communication occurs.

The Inter-domain key agreement protocol also requires that the first device (A) obtains the public key of the visited Home domain in an authenticated manner The first device (A) obtains public IBC parameters of the second device (B) in the domain of the second device and sends an inter-domain session request (steps 1 to 2).

The second device (B) will then use public IBC parameters of the first device (A) to compute a session key (steps 3 to 6) and send a challenge-response back to the first device (A) (step 7).

The first device (A) will repeat the operation to compute the session key (step 8) and finish the challenge-response exchange (step 9).

The Inter-domain key agreement protocol makes use of implicit key authentication to verify the legitimacy of the first message. The Inter-domain key agreement protocol will ultimately fail if this first message is forged.

With the session key just established, the first device (A) can request operations on the second device (B). To perform operations of the second device (B), the first device (A) must follow a protocol similar to the Functioning protocol mentioned earlier in FIG. 10. Because guest users have no attributes in domains they visit, domains must define the guest users as such an attribute as 'guest'. In this case, the attribute 'guest' may correspond to an attribute entitles guest devices to a limited set of permissions in the domain. Foreign operation requests are done in a manner similar to conventional operation requests.

The exception is that the first device (A) (i.e., guest) does not have to prove possession of a certain attribute set. Instead, the requested operation is permitted if the first device (A) are allowed performing the requested operation. That is, if the predicate to perform the operation is satisfied by the attribute 'guest'.

The Inter-domain operation protocol is explained in more detail in the following.

The first device (A) can obtain a first public key ($P_{B,I}^I$) of the second device (B) in the inter-domain. In this case, the first public key ($P_{B,I}^I$) corresponds to a public key of IBC. Specifically, the first device (A) can obtain the first public key ($P_{B,I}^I$) by mapping an ID ($id_{B,\mathcal{H}}$) of the second device (B) in the Home domain ($\mathcal{H}$) and using the second group generator point ($G_{\mathcal{H}}^i$) and IBC public key ($P_{\mathcal{H}}^{pi}$) of the Home domain of the second device (B) (step 1).

The first device (A) can transmit an inter-domain session request (inter_session_req) to the second device (B). In this case, the first device (A) can transmit a first random nounce ($n_A$) generated in the first device (A), a first number ($x_A$) randomly generated in the first device (A), and the first public key ($P_{B,I}^I$) to the second device (B) together with the inter-domain session request (step 2).

The second device (B) can obtain a first pairwise key ($k_{A,B}$) shared between the first device (A) and the second device (B). The first pairwise key ($k_{A,B}$) can be obtained by cryptograpicaly performing bilinear pairing on the received first public key) ($P_{B,I}^I$), the first number ($x_A$), and a first private key ($S_{B,I}^I$) of the second device (B) in the inter-domain using a second number ($x_B$) randomly obtained from the second device (B) (step 3). The first private key ($S_{B,I}^I$) corresponds to a private key in IBC. It may be utilize pairing (ê) to compute the first pairwise key ($k_{A,B}$) and may utilize a counter ($c_A$) to generate unique session keys.

The second device (B) can set a counter ($c_B$) generated in the second device to 0) step 4).

The second device (B) can obtain a second pairwise key ($k_{A,B}^i$) shared between the first device (A) and the second device (B) in an $i^{th}$ session (step 5). Specifically, the second device (B) may use the Session key protocol mentioned earlier in FIG. 2 to obtain the second pairwise key ($k_{A,B}^i$). The second device (B) can obtain the second pairwise key ($k_{A,B}^i$) using the first pairwise key ($k_{A,B}^i$) and the counter ($c_B$) among the Session key protocol mentioned earlier in FIG. 2.

Meanwhile, the second device (B) can obtain a public ID-based encrypted parameter of the first device (A) in the inter-domain. In particular, the second device (B) can obtain a second public key ($P_{A,I}^I$) of the first device (A) in the inter-domain. In this case, the second public key ($P_{A,I}^I$) corresponds to a public key of IBC. Specifically, the second device (B) can obtain the second public key ($P_{A,I}^I$) by mapping an ID ($id_{A,\mathcal{H}}$) of the first device (A) in the Home domain ($\mathcal{H}$) and using IBC public key ($P_{\mathcal{H}}^{pi}$) of the Home domain of the first device (A) (step 6).

The second device (B) can transmit a challenge-response to the first device (A). Specifically, the second device (B) can transmit a second random nounce ($n_B$) generated in the second device (B), the second number ($x_B$), the second public key ($P_{A,I}^I$), and a first message authentication code to the first device (A) (step 7). In this case, the first message authentication code may correspond to a message aythentication code of a message to which the first random nounce ($n_A$) is attached using the second pairwise key ($k_{A,B}^i$).

The first device (A) will repeat the operation to compute the session key. Specifically, the first device (A) can similarly compute the second pairwise key ($k_{A,B}^i$) using the material received in the step S1207.

The first device (A) can generate a specific value by concatenating the first random nounce ($n_A$) and the second random nounce ($n_B$). Subsequently, the first device (A) can transmit a second message authentication code of a message to which the specific value is attached using the second pairwise key ($k_{A,B}^i$) to the second device (B) (step 9). In this case, the first device (A) finishes the challenge-response exchange by transmitting the second message authentication code to the second device (B).

The second device (B) can transmit an inter-domain session response (inter_session_ask) corresponding to the inter-domain session request to the first device (A). In this case, the second device (B) can transmit a third message authentication code of a message to which a value of which 1 is added to the first random nounce ($n_A$) is attached using the second pairwise key ($k_{A,B}^i$) to the first device (step 10).

The Inter-domain operation is explained in more detail in the following.

If the first device (i.e., guest device) accesses a specific operation of the second device (B), the first device (A) can obtain public IBC parameters of the second device in the Home domain of the second device (B) and send an inter-domain session request to the second device (B). The second device (B) computes a session key using public IBC parameters of the first device and transmits a challenge-response to the first device (A). The first device (A) repeats operations for calculating a session key and finishes the challenge-response exchange. If a session key is established, the first device (A) can transmits a request to the second device (B) to indicate the specific operation to be performed in the second device (B). The second device (B) can transmit predicate of the specific operation to the first device (A) in response to the request of the specific operation. The first device (A) can transmit a signature satisfying the predicate to the second device (B) together with an execution command of the specific operation. If the received signature satisfies the predicate, the second device (B) can execute the specific operation according to the execution command of the specific operation. In this case, the predicate may correspond to an attribute predicate configured to execute the specific operation if an attribute of the guest device satisfies the guest.

Development

In the following, a method for development to which AoT is to be applied to provide authentication and access control using device IDs and attributes. In this case, assume that Cloud and Home domains are isolated, users and manufactures are allowed to control devices independently, AoT has lightweight requirements, AoT is provided to resource-constrained embedded devices AoT is deployable on different platforms.

Architecture

Figure 14:
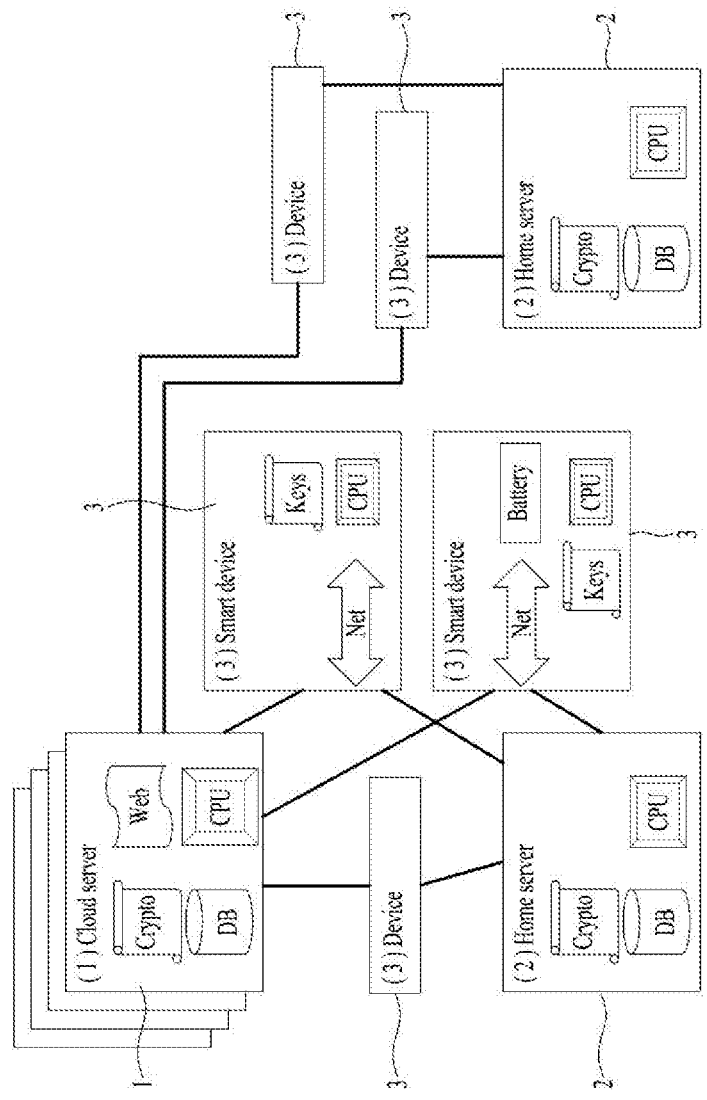
FIG. 14 is a diagram for explaining an architecture according to one embodiment of the present invention.

FIG. 14 is a diagram for explaining architecture according to one embodiment of the present invention.

FIG. 14 shows entities in architecture according to one embodiment of the present invention. According to one embodiment of the present invention, the entities include at least one selected from the group consisting of a Cloud server 1, a Home server 2, and a device 3.

The architecture includes one cloud server 1 to control the cloud domain of a manufacturer. Assume that the Cloud server has on-demand resource allocation typical of cloud environments.

And, the architecture also includes multiple Home servers 2, one for each Home domain. Although Home servers need not scale like Cloud servers, assume that a Home server 2 stays on and has sufficient resources to control hundreds of devices in the domain of the Home server. Home servers 2 can run on video-game consoles, desktop PCs, network gateways, or Hardware Secure Modules (HSMs).

Each device 3 connects to its Home domain and also to the manufacturer's Cloud domain. The architecture considers devices vary wildly (in terms of processing power, available memory, storage capacity, communication technologies, size, and weight) and may have constrained resources. The entities of the architecture can provide an interface to a user for interaction with the user.

Figure 15:
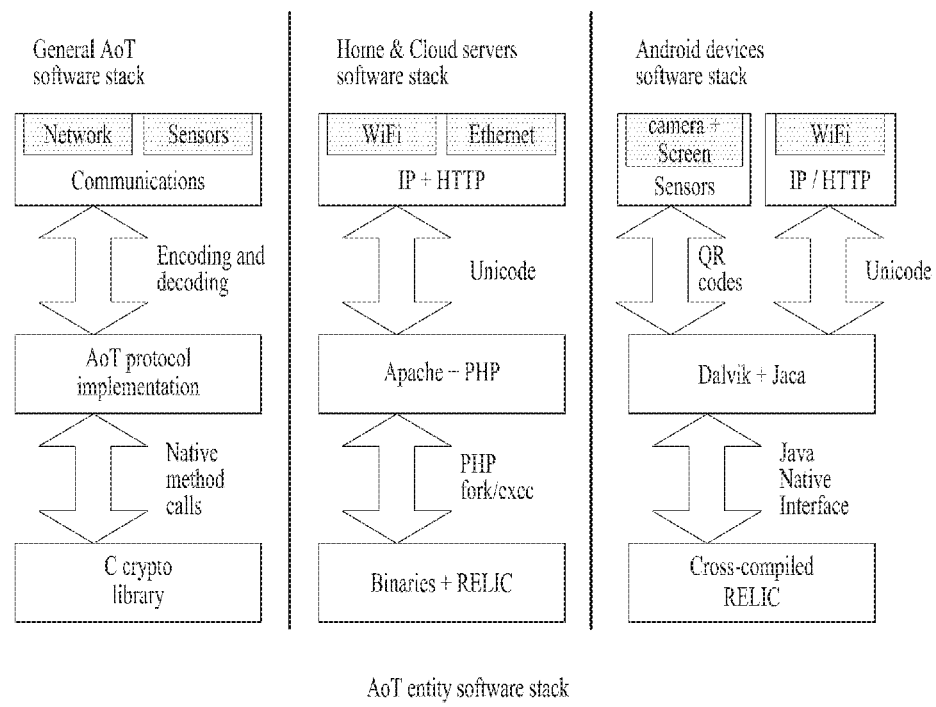
FIG. 15 is a diagram for explaining software stacks of AoT configuration elements according to one embodiment of the present invention.

The entities of the architecture run the software stack existing at the left of FIG. 15. The AoT protocol is implemented at the center of the software stack.

Implementation

In the following, software stacks according to one embodiment of the present invention are explained with reference to FIG. 14.

The architecture encompasses devices running heterogeneous hardware and different operating systems, each with their own specific software stack.

According to one embodiment of the present invention, Cloud and Home servers are implemented on Linux, Apache, MySQL (My Structured Query Language), and PHP (Hypertext Preprocessor). AoT is implemented on smartphones as a native Android application. The software stacks implemented on the Cloud server and the Home server are shown in the middle of FIG. 5 and the software stack implemented on the smartphones using Android application is shown in the right of FIG. 15, respectively.

The Cloud and Home servers communicate with devices using the HTTP protocol. The Web servers call binaries that implement AoT's cryptographic primitives from PHP.

On Android devices, a user can implement the user interface using Android's native interface, and use the Java Native Interface (JNI) to call functions on a cross-compiled cryptographic library.

Modifications to one layer in the stack do not imply changes in other layers. For example, it is able to exchange HTTP for another transport use a different cryptographic library.

Communication according to one embodiment of the present invention is explained in the following.

A cryptographic code is agnostic to message encoding and transport. Any two devices can exchange information using any mutually-supported encoding and protocol. As an example, it is able to exchange data using QR Codes, when a fridge is deployed in a Home domain in AoT. As a different example, it is able to exchange data using HTTP, when user attributes are changed from a smartphone in AoT.

User interfaces according to one embodiment are explained in the following.

Although entities belonging to the architecture share the same underlying implementation of the AoT protocol, the entities run application code and user interfaces implemented using native libraries. For example, Android applications run in Android's Dalvik virtual machine and use the Java Native Interface (JNI) to call our low-level AoT cryptographic functions.

Cryptography

All entities (Cloud servers, Home servers, and devices) in the architecture share the same underlying implementation of AoT protocol and use extended version of the RELIC crypto library. The RELIC targets resource-constrained devices and efficiently implements several curve-based cryptographic algorithms at different security levels. Most algorithms implemented in RELIC run on 8-bit and 16-bit embedded processors under 4 KiB of RAM.

According to one embodiment of the present invention, RELIC's performance is improved. Specifically, RELIC's performance including new architecture-dependent optimizations is improved by means of carefully crafted assembly for the ARM architecture.

The arithmetic backend makes extensive use of the wide 32-bit multiplier instruction UMLAL for implementing Karatsuba-Comba multiplication, squaring, and Montgomery modular reduction to accelerate algorithms used by AoT.

Targeting the 128-bit security level in resource-constrained platforms is somewhat uncommon in the research literature. According to the present invention, it is able to implement the ABS, which is the core of the access control mechanism, on top of RELIC. In this case, ABS implementation is based on the work of Maji, Prabhakaran, and Rosulek. In particular, four main algorithms including master key generation, attribute generation, signature generation, and signature verification are based on the work.

In AoT according to the present invention, the first two algorithms (master key generation and attribute generation) are run by Home servers, while the last two (signature generation and signature verification) are run by devices whenever access control is executed.

According to the present invention, implementations rely on PBC and Monotone Spam Programs (MSP). MSPs represent AoT policies as monotone boolean functions. Informally, monotone means that the boolean expression contains zero negations. According to the present invention, it is able to overcome this limitation by inverting attributes (e.g., creating attributes like "over 18" and "under 18").

The computational complexity of most ABS algorithms depends on PBC operations. Although the operations can be executed on resource-constrained devices, ABS requires devices to compute a product of pairings, which increases not only compute time but also memory consumption. As a solution to this problem, it may be able to utilize optimized RELIC to compute products of pairings simultaneously. Pairing computation can be divided in two phases including the Miller loop consisting of a square-and-multiply algorithm and the final exponentiation. When a product of pairings is computed simultaneously (a multi-pairing operation), squarings in the full extension field and the final exponentiation can be shared for all pairings, keeping a single variable accumulating partial results in the Miller loop.

Implementation of AoT according to one embodiment of the present invention may combine the following cryptographic protocols and algorithms 1) Sakai-Ohgishi-Kasahara (SOK): a non-interactive key distribution scheme allowing devices to derive symmetric keys without the need of communication.

2) Boneh-Franklin (BF-IBE): an identity-based encryption scheme adapted to employ asymmetric pairings.

3) Bellare-Namprempre-Nevem (vBNN-IBS): a pairing-free identity-based signature with shorter signatures and fast verification.

4) Maji-Prabhakaran-Rosulek (MPR-ABS): an attribute-based signature with attribute-privacy and collusion-resistance.

5) keyed-Hash Message Authentication Code (HMAC): a specific type of message authentication code (MAC) involving a cryptographic hash function, using SHA256.

6) Advanced Encryption Standard (AES): the standard for symmetric encryption, using CBC mode.

In the following, parameterization according to one embodiment of the present invention is explained.

According to one embodiment of the present invention, the cryptographic protocols in AoT were implemented using pairing-friendly curves with embedding degree 12 suited to the 80- and 128-bit security level. In particular, according to the present invention, it is able to adopt Barreto-Naehrig curves parameterized by integers of Equation 3 or Equation 4 shown in the following. In this case, Equation 3 corresponds to a function at the 80-bit level and Equation 4 corresponds to a function at the 120-bit level.

$$u=(2^{38}+2^{32}+2^{5}+1)$$ [Equation 3]

$$u=-(2^{62}+2^{55}+1)$$ [Equation 4]

The curves are defined with a prime modulus shown in Equation 5 and are defined with a group order shown in Equation 6 in the following.

$$p=36u^4+36u^3+24u^2+6u+1$$ [Equation 5]

$$n=36u^4+36u^3+18u^2+6u+1$$ [Equation 6]

The curves support an efficient optimal pairing construction.

Variable-base and fixed-base scalar multiplications were implemented using the window NAF and single-table comb methods, respectively. Parameters for 80-bit security address legacy systems and more constrained devices, while parameters for 128-bit security are current candidates for standardization and ensure long-term security and efficiency.

In the following, security of AoT according to the present invention is explained.

Since the security of AoT requires the small amount of computational resources, it supports arrangement in resource-constrained embedded devices.

AoT provides security properties including authentication, confidentiality, freshness, integrity, and non-repudiation. Precisely, AoT uses 1) MACs and digital signatures for authentication, 2) ciphers for confidentiality, 3) nonces and counters for freshness, 4) MACs, digital signatures, and hash functions for integrity, and 5) digital signatures for non-repudiation.

In the following, the aforementioned properties of AoT are explained using Scyther corresponding to a tool for automated verification of security protocols. Yet, protocols in the stages of Session key, Pre-deployment, and Ordering are excluded from AoT protocols. This is because a session key does not exchange a message, while Scyther compares protocols in terms of communication. And, this is because the Pre-deployment stage and the Ordering stage are protected via secure channels.

Scyther analyzes protocols verifying if the protocol is prone to known attacks that could violate its security properties. Scyther assumes that cryptographic algorithms are ideal from a security point of view, and finds flaws arising from protocol's message exchanges. Protocols must be described using Scyther's Security Protocol Description Language (SPDL). SPDL describes protocols as a set of roles. Each role specifies one of the agents in the protocol.

All AoT's security properties have been successfully verified by Scyther, except the authentication in the Inter-DomainKeyAgreement protocol. Scyther raises a false alarm for the InterDomainKeyAgreement protocol.

Regarding this, it is explained with reference to FIG. 13 again.

Scyther raises a false alarm for the InterDomainKeyAgreement protocol because it is unable to identify the implicit key authentication taking place to ensure the authenticity of the protocol's first message (step 2). The message in question is sent with no explicit authentication mechanism. Instead, this message is authenticated by the message authentication codes of the subsequent messages (steps 7 and 9). The message authentication codes are computed using a pairwise key ($k_{A,B}^i$) shared in a first device (A) and a second device (B) in an $i^{th}$ session. The pairwise key ($k_{A,B}^i$) is generated in a manner of relying on a first number ($X_A$) randomly generated in the first device (A). When the first number ($X_A$) and an IBC public key ($P_{B,I}^J$) of the second device in the inter-domain (I) are given, although the public key ($P_{B,I}^J$) is public, it is considered unfeasible for Scyther to derive the first number ($X_A$). Hence, it is also considered unfeasible for an adversary intending to perform attack to derive the pairwise key ($k_{A,B}^i$). Alternatively, the adversary could intercept a message of the first device (A) and launch an impersonation attack against the second device (B) using a false parameter related to the first number. In this case, however, the session keys computed by the first device (A) and the second device (B) (steps 3 to 5 and 8, respectively) will not match, the verification of the message authentication codes generated from the first device (A) and the second device (B) will fail, and the protocol will thus abort. In conclusion, all the aforementioned security properties hold in InterDomainKeyAgreement protocol as well.

In the following, computational costs and communication overhead of AoT are analyzed.

It is able to quantify computational costs of AoT as a function of the number of the most expensive cryptographic operations in cryptographic algorithms of AoT. In particular, it may consider the number of pairings and elliptic curve scalar multiplications. Other operations are executed in negligible time. It is able to quantify communication overhead as the amount of bytes in a signature or the overhead caused by encryption techniques.

FIG. 16 is a table for explaining a comparison result between time for performing AoT and communication overhead.

Referring to FIG. 16, ABS is the most expensive cryptographic algorithm in AoT. ABS is also the core of the access control mechanism in the Functioning stage and the most frequently used algorithm in AoT. The computational cost of ABS grows with the size of the span program matrix generated from the predicate. The span program matrix has dimensions 1×t, where 1 is the number of attributes and t is the number of 'and' (^) operators in the predicate plus one.

Communication overhead for most algorithms is constant. The overhead is computed in consideration of 8-byte nonces and 1-byte labels. Communication overhead in ABS depends on the size of the span program matrix, but it is still small enough to fit in one or a few network packets. Network transmission delay and energy costs induced by AoT are negligible compared to CPU processing time and energy costs.

FIG. 17 is a table for illustrating performance of devices used in evaluating AoT according to one embodiment of the present invention.

Referring to FIG. 17, a first device (A) corresponds to such a device as G3, a second device (B) corresponds to such a device as Edison, and a third device (C) corresponds to such a resource-constrained device as Arduino Due.

In FIGS. 18 to 22, evaluation results evaluated using the third device (C) are explained.

Figure 18:
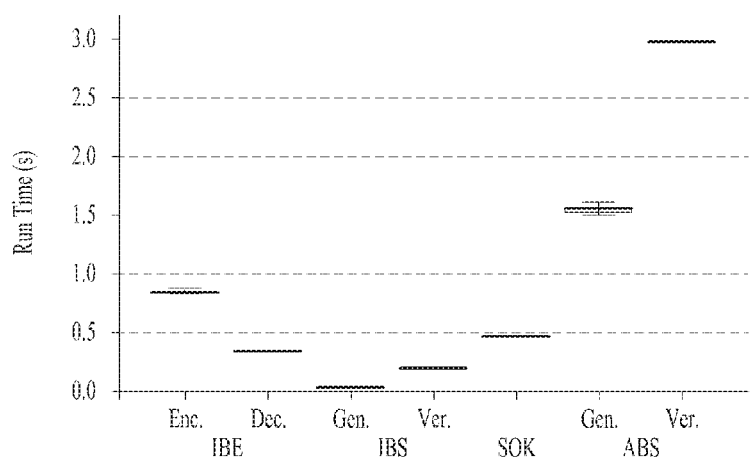
FIG. 18 is a diagram of run times for asymmetric cryptographic algorithms used in AoT according to one embodiment of the present invention.
Figure 19:
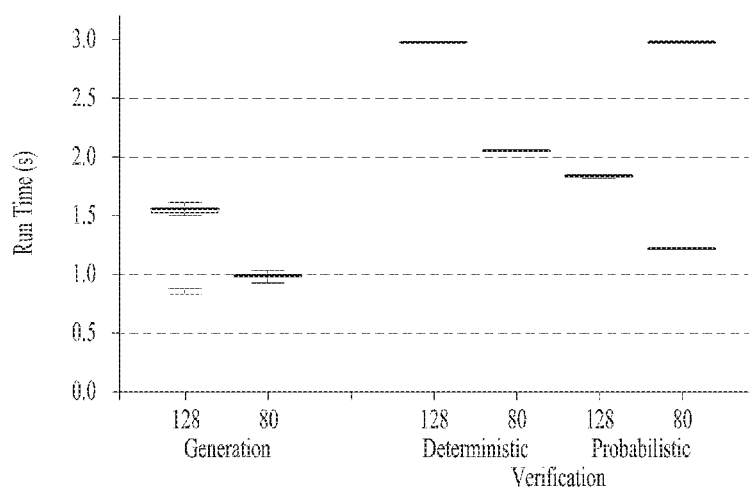
FIG. 19 is a diagram of run times for different security levels and configurations used in one embodiment of the present invention.

FIG. 18 is a diagram of run times for asymmetric cryptographic algorithms used in AoT according to one embodiment of the present invention and FIG. 19 is a diagram of run times for different security levels and configurations used in one embodiment of the present invention.

Referring to FIG. 18, all cryptographic algorithms run in reasonable time.

ABS is the most expensive algorithm and takes less than 1.6 seconds to generate signatures and less than 3.0 seconds to verify signatures for predicates on the form shown in Equation 7 in the following.

$$A \wedge B \qquad \text{[Equation 7]}$$

When FIG. 18 and FIG. 19 are compared, it is able to check run times for different ABS configurations on the third device for predicates of the form shown in Equation 7. Referring to FIG. 19, it is able to check results for 80- and 128-bit security levels. According to the present invention, it is able to trade-off security for shorter execution times.

Meanwhile, extended RELIC library and the AoT implementation takes 147 KB of storage, which fits on the third device.

The AoT's most expensive cryptographic algorithm is ABS. ABS is also the most frequently used algorithm in AoT.

Figures 20, 21:
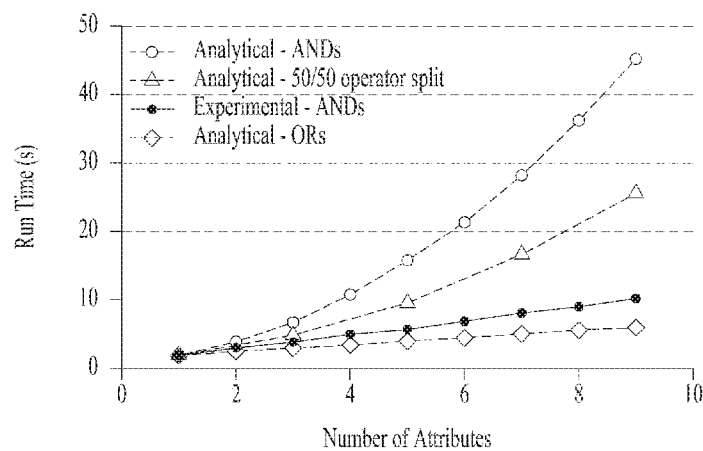
FIG. 20 is a table illustrating run times for Scalar point multiplication and run times for pairing computation on a specific group.
FIG. 21 is a diagram for a result of evaluating attribute-based authentication signature verification run times for different predicate structures in AoT according to one embodiment of the present invention.

FIG. 20 is a table illustrating run times for Scalar point multiplication and run times for pairing computation on a specific group.

Figure 22:
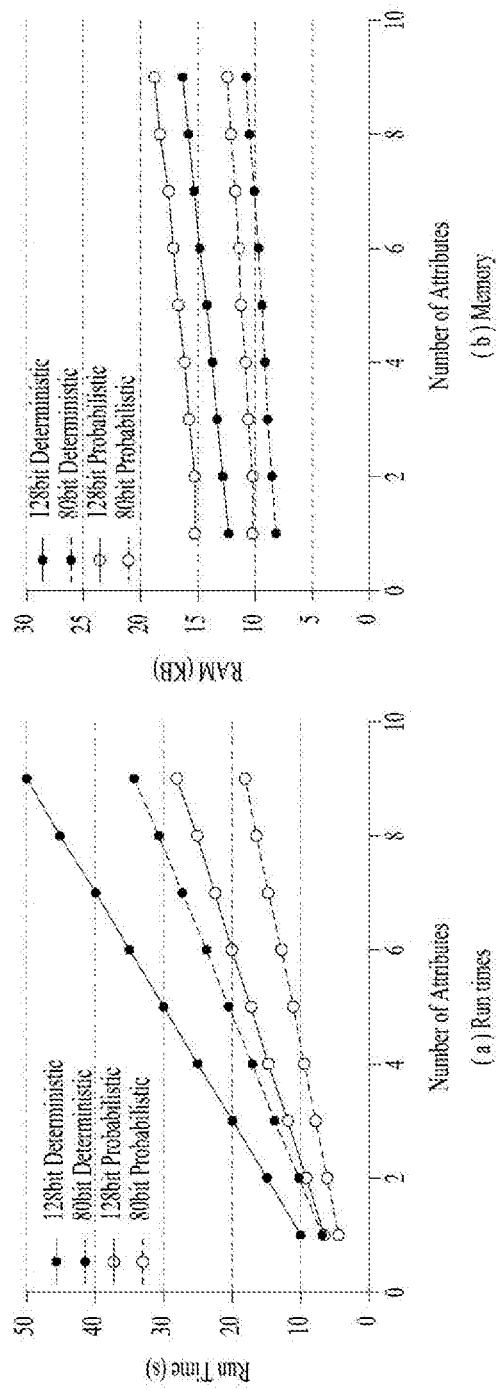
FIG. 22 is a diagram for explaining attribute-based authentication signature verification run times and memory use rate in AoT according to one embodiment of the present invention.

The Scalar point multiplication and the pairing computation are the building blocks of cryptographic algorithms used in AoT FIG. 21 is a diagram for a result of evaluating attribute-based authentication signature verification run times for different predicate structures in AoT according to one embodiment of the present invention and FIG. 22 is a diagram for explaining attribute-based authentication signature verification run times and memory use rate in AoT according to one embodiment of the present invention.

Referring to FIG. 21, x axis corresponds to the number of attributes. ABS verification run times are estimated analytically. In FIG. 21, it is able to see that the third device (C) can verify signatures for complex predicates with up to nine attributes and only 'and' operators in less than a minute. For more usual predicates including between 1 and 3 attributes, signature verification is estimated in less than 6 seconds.

In FIG. 22, worst-case predicates are assumed. For example, it is assumed that the worst-case predicates contain only 'and' operators. Referring to FIG. 22, it is able to see four curves for deterministic and probabilistic verification at the 80- and 128-bit security levels.

When FIG. 21 and FIG. 22 are compared, it is able to see that analytical run times significantly overestimate the implementation run times. There are two main reasons for this. First, a code is optimized to compute multi-pairings simultaneously. Second, analytical costs consider that the t×1 coefficient matrix in a predicate's MSP does not contain any zero.

Referring to FIG. 22 (a), it is able to see that run time of ABS in AoT can be reduced by either reducing the security level or by using probabilistic verification. In particular, probabilistic verification at the 80-bit level enables implementation to verify signatures in around 1.2 s, which should be enough for most interactive applications. It is also necessary to consider that predicates with 'or' operators require less computation and further reduce verification run times.

Referring to FIG. 22 (b), it shows a result for measuring maximum memory utilization. ABS fits on resource-constrained devices such as the third device (C). This is because ABS requires under 19 KB of memory for a predicate with nine attributes and eight 'and' operators.

In the following, how AoT performs on more resourceful architectures is described. As AoT's memory and storage requirements are negligible compared to the amount of RAM and storage available on such a first device (A) as the Edison of Intel and such a second device (B) as the G4 of LG, we focus on execution time.

Figure 23:
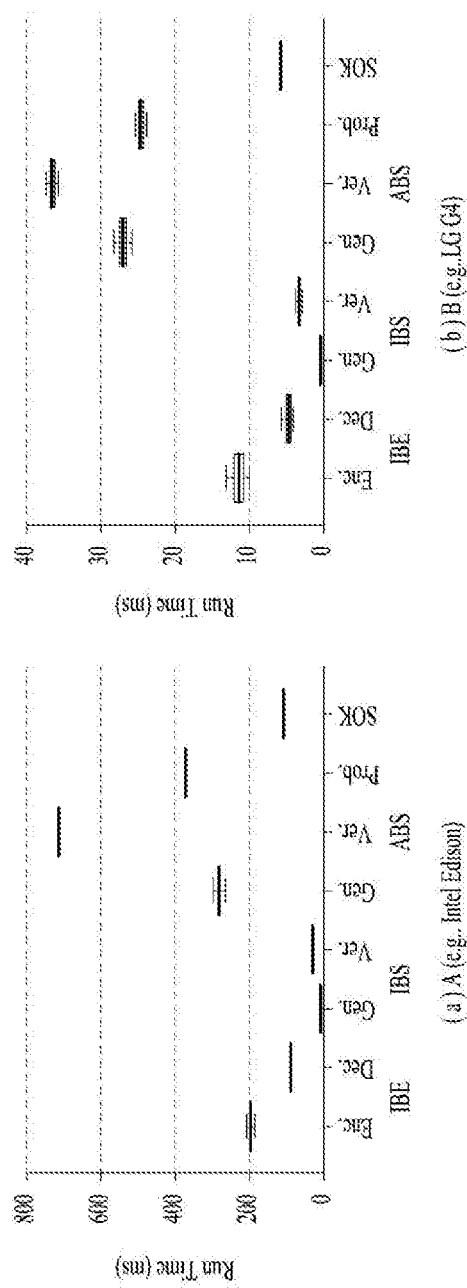
FIG. 23 is a diagram of an experimental result for run times of cryptographic algorithm executed in a first product and a second product according to one embodiment of the present invention.

FIG. 23 is a diagram of an experimental result for run times of cryptographic algorithm executed in a first product and a second product according to one embodiment of the present invention.

As shown in FIG. 23, it is able to see that the first device (A) and the second device (B) have processors significantly more powerful than the third device (C) used for evaluating in FIGS. 18 to 22.

Figure 24:
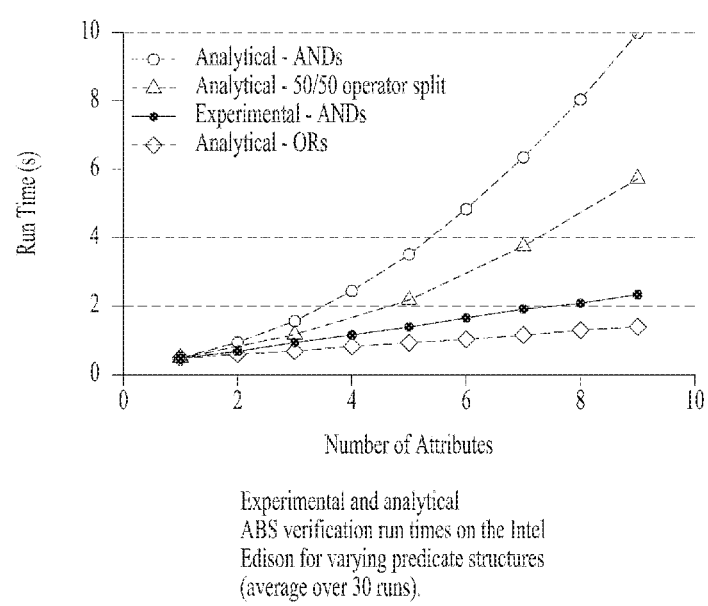
FIG. 24 is a diagram for experimental and analytical runtimes for various predicate structures executed in a first device.

FIG. 24 is a diagram for experimental and analytical runtimes for various predicate structures executed in a first device.

Referring to FIG. 24, the first device can verify complex predicates with various attributes in less than 2 s.

According to at least one or more aforementioned embodiments of the present invention, it is able to provide an authentication and access control solution appropriate for IoT. And, it is able to provide a suit of protocols providing authentication and access control throughout the entire IoT device life-cycle. And, it is able to provide authentication and access control in cloud domain and home domain. And, it is able to make a guest device authenticate itself from other external domain. And, it is able to make a specific device join domain owned by the specific device and other domain and to make the specific device access operation of external devices by authenticating itself. And, it is able to securely transfer ownership of a device. And, it is able to execute authentication providing stronger security and access control.

Although each drawing is explained in a manner of being divided for clarity, it is able to configure a new embodiment to be implemented in a manner of combining embodiments described in each drawing with each other. And, designing a recording media readable by a computer in which a program for implementing the aforementioned embodiments is recorded according to the necessity of those skilled in the art also belongs to the scope of the present invention.

The AoT system and the AoT method of the present specification can be implemented by codes readable by a computer in media in which a program is recorded. Media readable by a processor includes all kinds of recording devices in which data readable by a processor is stored.

Examples of the media readable by a computer include a HDD (hard disk drive), an SSD (solid state disk), an SDD (silicon disk drive), a ROM, a RAM, a CD-ROM, a magnetic tape, a floppy disk, an optical data storing device and the like. And, the media can be implemented in a form of a carrier wave (e.g., transmission via the internet).

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. An Authentication Of Things (AoT) system, comprising:
   a cloud server configured to control a cloud domain, wherein the cloud server is configured to connect to a plurality of devices;
   a home server configured to control a home domain, wherein the home server is configured to connect to the plurality of devices;
   a first device in which cryptographic material of the cloud server is loaded from the cloud server in a pre-deployment stage,
   wherein the cryptographic material includes at least one of an identifier of the first device in the cloud server, a first private key of an ID-based cryptography system of the first device in the cloud server, a first pairwise key of the first device in the cloud server, or a counter of the first device, and
   wherein, the cloud server is further configured to delete the first private key from the cloud server when indication that the first device is shipped to a trader is received at the cloud server; and
   a second device of a root user configured to connect to the home domain while authentication is completed in the home server,
   wherein, the first device is configured to receive a Personal Identification Number (PIN) of the first device in a deployment stage, an identifier of the second device in the home domain, a public key of an ID-based cryptography system of the home server in the home domain, and counters of the plurality of devices of the home domain from the second device,
   wherein the first device is further configured to generate a second pairwise key which is shared between the first device and the home server and is valid during a predetermined period, encrypt the second pairwise key using a public key received from the first device, and transmit a ciphertext of the encrypted second pairwise key to the second device,
   wherein the second device is further configured to receive attributes of the first device and first information on a first predicate of the first device from a user, and transmit an arrangement command of the first device, the first information, and the ciphertext to the home server,
   wherein the home server is further configured to issue, to the first device, a second private key of the ID-based cryptography system of the first device in the home domain and a third private key of an Attribute-based cryptography system of the first device in the home domain, and broadcast, to the first device and the plurality of devices, second information including attributes and predicates of the plurality of devices and the first device, and
   wherein the second private key of the ID-based cryptography system of the first device in the home domain is used to perform key distribution, and the third private key of the Attribute-based cryptography system of the first device in the home domain is used to control access to device operations.

2. The AoT system of claim 1, wherein one of the plurality of devices includes a third device, wherein the first device is further configured to:
   transmit a request for performing a specific operation to the third device when an input for indicating to perform the specific operation in the third device is received from the user after the first device is assigned to the home server.

3. The AoT system of claim 2, wherein the third device is configured to transmit a second predicate of the specific operation to the first device in response to the request for performing the specific operation.

4. The AoT system of claim 3, wherein the first device is further configured to transmit a first signature satisfying the second predicate to the third device with an execution command of the specific operation.

5. The AoT system of claim 4, wherein the third device is further configured to execute the specific operation according to the execution command of the specific operation when the first signature satisfies the second predicate.

6. A method for performing an Authentication Of Things (AoT), the method comprising:
   controlling, by a cloud server, a cloud domain;
   connecting, by the cloud server, to a plurality of devices;
   controlling, by a home server, a home domain;
   connecting, by the home server, to the plurality of devices;
   loading, by a first device, cryptographic material of the cloud server in a pre-deployment stage, wherein the cryptographic material includes at least one of an identifier of the first device in the cloud server, a first private key of an ID-based cryptography system of the first device in the cloud server, a first pairwise key of the first device in the cloud server, or a counter of the first device;
   deleting, by the cloud server, the first private key from the cloud server when indication that the first device is shipped to a trader is received at the cloud server;
   receiving, by the first device, a Personal Identification Number (PIN) of the first device in a deployment stage, an identifier of the second device in the home domain, a public key of an ID-based cryptography system of the home server in the home domain, and counters of the plurality of devices of the home domain from the second device;
   generating, by the first device, a second pairwise key which is shared between the first device and the home server and is valid during a predetermined period;
   encrypting, by the first device, the second pairwise key using a public key received from the first device;
   transmitting, by the first device, a ciphertext of the encrypted second pairwise key to the second device,
   receiving, by the second device, attributes of the first device and first information on a first predicate of the first device from a user;

transmitting, by the second device, an arrangement command of the first device, the first information, and the ciphertext to the home server;

issuing, by the home server to the first device, a second private key of the ID-based cryptography system of the first device in the home domain and a third private key of an Attribute-based cryptography system of the first device in the home domain;

broadcasting, by the home server to the first device and the plurality of devices, second information including attributes and predicates of the plurality of devices and the first device, wherein the second private key of the ID-based cryptography system of the first device in the home domain is used to perform key distribution, and the third private key of the Attribute-based cryptography system of the first device in the home domain is used to control access to device operations.

7. The method of claim 6, wherein one of the plurality of devices includes a third device, wherein the method further comprises:

transmitting, by the first device, a request for performing a specific operation to the third device when an input for indicating to perform the specific operation in the third device is received from the user after the first device is assigned to the home server.

8. The method of claim 7, further comprising:

transmitting, by the third device, a second predicate of the specific operation to the first device in response to the request for performing the specific operation.

9. The method of claim 8, further comprising:

transmitting, by the first device, a first signature satisfying the second predicate to the third device with an execution command of the specific operation.

10. The method of claim 9, further comprising:

executing, by the third device, the specific operation according to the execution command of the specific operation when the first signature satisfies the second predicate.

* * * * *